(12) United States Patent
Weiss

(10) Patent No.: US 11,321,019 B2
(45) Date of Patent: May 3, 2022

(54) EVENT PROCESSING

(71) Applicant: ACCEMIC TECHNOLOGIES GMBH, Kiefersfelden (DE)

(72) Inventor: Alexander Weiss, Kiefersfelden (DE)

(73) Assignee: ACCEMIC TECHNOLOGIES GMBH, Kiefersfelden (DE)

( * ) Notice: Subject to any disclaimer, the term of this patent is extended or adjusted under 35 U.S.C. 154(b) by 32 days.

(21) Appl. No.: 17/017,890

(22) Filed: Sep. 11, 2020

(65) Prior Publication Data
US 2021/0081145 A1 Mar. 18, 2021

(30) Foreign Application Priority Data

Sep. 13, 2019 (EP) .................................. 19197354

(51) Int. Cl.
*G06F 3/06* (2006.01)
*G06F 9/54* (2006.01)
(Continued)

(52) U.S. Cl.
CPC .......... *G06F 3/0659* (2013.01); *G06F 3/0604* (2013.01); *G06F 3/0673* (2013.01);
(Continued)

(58) Field of Classification Search
None
See application file for complete search history.

(56) References Cited

U.S. PATENT DOCUMENTS 5,504,869 A * 4/1996 Uchida ................. G06F 9/4494
712/214
5,699,460 A * 12/1997 Kopet .................... H04N 19/61
382/307

(Continued)

FOREIGN PATENT DOCUMENTS

EP 2873983 5/2015
GB 2487251 7/2012

OTHER PUBLICATIONS

Papadopoulos et al. "Monsoon: an Explicit Token-Store Architecture," Proceedings of the Annual International Symposium on Computer Architecture, IEEE, May 28, 1990, vol. Symp. 17, pp. 82-91.

(Continued)

*Primary Examiner* — Eric Coleman
(74) *Attorney, Agent, or Firm* — Sheridan Ross P.C.

(57) ABSTRACT

An event-processing unit for processing tokens associated with a state or state transition, herein also referred to as an event, of an external device is disclosed. The EPU allows token-processing schemes, in which the processing of incoming tokens and the further handling of a processing result by the EPU are determined not only by the token identifier, but also by the payload data of the incoming token or by data in the data memory. A flag-processing capability of a processing-control stage allows applying flag-processing operations such as logical operations to data obtained as a processing result of an ALU-processing operation. The result of these operations determines a subsequent handling of ALU-result data by the EPU. Thus, whether or not the ALU-result data is written to the data memory also influences the processing of any subsequent incoming tokens for which that data is used in the ALU-processing operation.

18 Claims, 20 Drawing Sheets

(51) Int. Cl.
*G06F 9/30* (2018.01)
*G06F 11/36* (2006.01)
*G06F 15/82* (2006.01)

(52) U.S. Cl.
CPC ............ *G06F 9/3001* (2013.01); *G06F 9/542* (2013.01); *G06F 11/3636* (2013.01); *G06F 15/825* (2013.01)

(56) References Cited

U.S. PATENT DOCUMENTS

| | | | | |
|---|---|---|---|---|
| 7,095,783 B1 * | 8/2006 | Sotheran | ............... | G06F 9/3867 375/240.01 |
| 8,024,489 B2 * | 9/2011 | Day | ........................ | G06F 13/32 710/5 |
| 8,224,884 B2 * | 7/2012 | May | .................. | G06F 15/17381 709/201 |
| 10,521,395 B1 * | 12/2019 | Fick | .................. | G06F 15/17337 |
| 2004/0123293 A1 * | 6/2004 | Johnson | .................. | G06F 9/466 718/101 |
| 2009/0043709 A1 * | 2/2009 | Chang | ..................... | H04L 41/12 705/67 |
| 2013/0046954 A1 * | 2/2013 | Ruehle | ................ | H04L 47/2483 712/1 |
| 2015/0074680 A1 * | 3/2015 | Zhang | ....................... | G06F 1/10 718/104 |
| 2015/0370571 A1 * | 12/2015 | Stark | ................... | G06F 9/30003 712/206 |
| 2016/0224349 A1 * | 8/2016 | Ge | ........................ | G06F 9/3838 |
| 2017/0212759 A1 * | 7/2017 | Yang | .................. | G06F 9/30145 |

OTHER PUBLICATIONS

Extended Search Report for European Patent Application No. 19197354.4, dated May 7, 2020, 9 pages.

* cited by examiner

EVENT PROCESSING

CROSS-REFERENCE TO RELATED APPLICATIONS

This application claims the benefit of European Patent Application No. 19197354.4 filed 13 Sep. 2019, the entire contents of which are incorporated herein by reference in its entirety.

FIELD

The present invention relates to an event-processing unit for processing tokens associated with a state or state transition, herein also referred to as an event, of an external device.

BACKGROUND

Even though the processing speed of modern computer processors has seen a sharp increase over the last decades, the processing of high-bandwidth data streams still remains a challenge. Various technical fields require a processing of data streams approaching 1 Gbit/second online, i.e. while a stream is being generated.

As an application example, modern software design projects are often targeted at embedded processors, for instance in a System-on-Chip (SoC), and often times at multicore processor architectures. In multicore SoC implementations of embedded systems it is possible to spread out computations over many cores. This delivers very high performance to the software engineer and thus enables complex software systems to be implemented. On the other hand, debugging and validating of these systems is difficult. However, there is a need to comprehensively monitor the program execution flow, for instance in order to be able to detect non-deterministic errors, which may occur in such systems with high probability, and to remove the defects causing such errors. Various technological approaches try to solve this dilemma. Generally, tracing is used in software engineering as a tool for logging information about a program's execution. In order to follow a program execution flow in a processor, the executed instructions, data accesses and other information have to be provided for analysis. This is done in the form of trace data forming a trace data stream. For collecting information on a program execution on an embedded processor, embedded trace devices have been in use, which collect internal state information on the chip, filter it and provide the trace data in form of a strongly compressed trace-data stream containing the filtered state information as an output. In the subsequent handling of the trace-data stream, the trace data can be stored for a later offline analysis.

In many application cases, a high bandwidth stream of up to some 100 million of events per second is included in the trace-data stream. However, the large amount of data that is produced by modern embedded multi-core processors requires a large amount of memory. Moreover, an offline analysis has the further disadvantage that there is a delay between the program execution on the SoC and the analysis of the trace data, which slows down the diagnostics of problems during program execution.

As a consequence, for this exemplary application case, there is a need for an online analysis unit that is able to process a stream of tokens with a high rate of data representing events.

An analysis unit that is able to check constraints of arbitrary number and complexity and can handle a data stream with such a rate of events is very challenging to realize with a conventional computer architecture. Conventional processing schemes, such as the von Neumann control-flow architecture, can be used to implement an event processing unit that is able to check constraints of arbitrary number and complexity. However, in order to handle a trace-data stream with such a high rate of events, the stream has to be split and analyzed in parallel by multiple event processing units. Yet, such a parallelization of the von Neumann control-flow architecture only is efficient, if the event processing units almost entirely act on local data and rarely interact. If the event processing units are only allowed to act on local data, they only have access to a subset of events in the trace-data stream and as a result not all types of constraints can be checked.

An alternative concept to the von Neumann control flow architecture is the data flow architecture.

An example of a data flow architecture is described in G. M. Papadopoulos and D. E. Culler, "Monsoon: An Explicit Token-Store Architecture", Proceedings, The 17th Annual International Symposium on Computer Architecture, IEEE, 1990, ISBN: 0-8186-2047-1. There, a general purpose data flow multiprocessor, referred to as Monsoon, is described. Monsoon is based on an Explicit Token Store (ETS) architecture, which is particularly designed to handle the analysis of data streams. In the ETS architecture, hardware dynamically schedules operations with available operands. When a token arrives at a processor, a tag it carries is checked against the tags present in a token store. If a matching token is found, it is extracted, and a corresponding instruction is enabled for execution; otherwise, the incoming token is added to the token store.

In the ETS architecture, operations are not performed in a linear manner, but rather dynamically scheduled in dependence of the available operands. In this architecture, data is bundled together in a token that also includes a reference to a function and a reference to a location in a memory. The function is only executed, if the data belonging to the token and the data stored in the referenced location in the memory is complete. If data is missing, the data belonging to the token is saved in the referenced location in the memory and the execution of the function is postponed until the arrival of the last token carrying relevant data.

SUMMARY

According to the present invention, an event-processing unit, hereinafter also referred to in short as an EPU, for processing tokens associated with a state or state transition, herein also referred to as an event, of an external device comprises:
  an input stage for receiving at least one incoming token, the incoming token carrying a token identifier indicative of one event from a predetermined set of events, and payload data;
  a next-command-computing stage that receives the incoming token from the input stage and comprises
    a command memory that allocates to a predetermined set of token identifiers a set of command identifiers and that comprises command-set data that allocates to the set of command identifiers control information comprising at least
      ALU-operation information indicative of an arithmetic-logical-processing operation to be performed, and
      a data-read identifier indicative of a data-memory address to read from in a data memory or a data-write identifier indicative of a data-memory address to write to in the data memory, and flag-operation information indicative of a flag-processing operation to be performed; wherein the command memory is configured to provide the control information associated with the token identifier of the incoming token;

a processing stage for receiving and processing the control information and the incoming token and that comprises a data-processing stage and a processing-control stage; wherein the data-processing stage comprises (i) the data memory, which is configured to provide data, which is stored under the data-memory address indicated by the data-read identifier, upon reception of the data-read identifier;

(ii) an arithmetic-logic unit, referred to as ALU, that receives the data provided by the data memory, the payload data of the incoming token, and the ALU-operation information, and that is configured to perform the arithmetic-logical-processing operation indicated by the ALU-operation information using the data or the payload data as operands and to provide ALU-result data indicative of a result of the arithmetic-logical-processing operation, and to provide one or more ALU-result flags indicative of predefined arithmetic-logical status information associated with the ALU-result data; and wherein the processing-control stage receives the flag-operation information, the ALU-result data, and the ALU-result flag, and is configured to perform the flag-processing operation indicated by the flag-operation information using the ALU-result flag, and, if instructed by a result of the flag-processing operation, write the ALU-result data to the data memory under the data-memory address indicated by the data-write identifier.

The EPU of the present invention allows token-processing schemes, in which the processing of the incoming token and the further handling of a processing result by the EPU are determined not only by the token identifier, but also by the payload data of the incoming token or by data stored in the data memory. In particular, the flag-processing capability of the processing-control stage allows applying flag-processing operations such as logical operations to data obtained as a processing result of the ALU-processing operation. Furthermore, the result of the logical operations determines a subsequent handling of the ALU-result data by the EPU, in particular, whether or not the ALU-result data is written to the data memory under the data-memory address indicated by the data-write identifier. As a consequence, whether or not the ALU-result data is written to the data memory also influences the processing of any subsequent incoming tokens for which that data is used in the ALU-processing operation.

As a first simple non-limiting example, the achieved effect comprises a heretofore unknown operability of the EPU in checking a constraint of the following type: "check if a program step B is only executed during a program execution flow after a program step A was executed". Program steps A and B may for instance be different instructions of a program executed by a device under test or under observation (DUT), and identified under respective instruction addresses 1000 and 2000.

As a second simple non-limiting example, the achieved effect further comprises a heretofore unknown operability of the EPU in checking of a constraint of the type: "check if a second program thread writes to a variable between read and write operations to this variable performed by a first program thread".

In the following, certain features of the event-processing unit of the present invention will be highlighted and explained in greater detail.

The event processing unit is configured to process the incoming token, which comprises a token identifier and payload data. The token identifier serves for identifying an event which has led to a creation of the token. Moreover, the payload data comprised by the token provides additional data which is typically related to the event. As explained before, the term "event" is to be understood broadly as a state or state transition of an external device, which state or state transition is expressed by data indicative one or more values of any one or more suitable measurable quantities describing the state or the state transition.

The event-processing unit of the present invention allows processing tokens using different processing schemes in accordance with their token identifier. For this, the next-command-computing stage comprises the command memory. The command memory receives the token identifier of the incoming token and provides the respective command identifier associated with the token identifier. The associated command identifier is determined using a predetermined allocation that allocates token identifiers to command identifiers. A very simple example of an allocation is achieved by letting the respective command identifier be identical to the token identifier. However, as will become clear in the context of the description of embodiments further below, other allocations may be used for achieving further advantages in certain application cases.

With respect to the processing of the payload data, the event-processing unit provides different processing capabilities such as reading data from the data-memory, performing ALU-processing operations, performing flag-processing operations, and writing data to the data memory. How these processing capabilities are used in the processing of the payload data of the incoming token is determined by the command identifier and the respective control information, which is retrievable from the command memory.

The command memory of the next-command-computing stage provides command-set data that allocates control information to command identifiers. The command memory receives the command identifier and is configured to retrieve and provide from the command-set data stored in the command memory that control information which is allocated to the respective command identifier. The control information provided by the command memory comprises at least one of ALU-operation information, a data-read identifier, a data-write identifier and flag-operation information, preferably, however, a complete control information set comprising at least the ALU-operation information, the data-read identifier, the data-write identifier and flag-operation information.

In particular, the control information comprises ALU-operation information. The ALU-operation information indicates which operations are to be performed by the ALU, using the data or the payload data as operands. Arithmetic-logical-processing operations to be performed by the ALU comprise in different variants one or more operations of arithmetic, logical or relational type, of one such type alone or of any combination of these types of operations. The ALU applies these operations according to the ALU-operation information to the payload data of the incoming token and/or the data retrieved from the data memory. The data is provided to the ALU by the data memory through a read operation. The read operation is facilitated by the control information, in particular the data-read identifier received by the data memory and indicative of the data-memory address targeted by the read operation. The result of the ALU-processing operation is given by the ALU-result data and the ALU-results flags. The ALU-result flags indicate predefined arithmetic-logical status information associated with the ALU-result data. For example, the predefined arithmetic-logical status information includes negative, zero, carry, and overflow.

The further processing of the ALU-results data and the ALU-result flag(s) is determined by the flag-operation information comprised in the control information allocated to the given command identifier. The flag-operation information determines a flag-processing operation to be performed by the processing-control stage. For example, the flag-processing operation may include one or more logical operations to be applied to the ALU-result flag(s). The result of the flag-processing operation determines if the ALU-result data is written to the data memory, wherein the data-write identifier included in the control information determines the memory address the ALU-result data is to be written to. In a particularly simple variant of the event-processing unit, the data-write identifier is identical to the data-read identifier.

Another advantage of the EPU is that it allows an execution of token-processing schemes that comprise a reading and a writing operation to the data memory. The read operation is performed by the data memory, which receives the data-read identifier and is configured to provide the data stored under the memory address indicated by the data-read identifier.

This functionality is useful to map high-level language constructs (e.g., TeSSLa) to the hardware.

The inventors have recognized that the processing performance is improved in many application cases by enabling a dependence of the processing on a result of a previous processing step. In conventional dataflow architectures, as for example in the Monsoon processor, an outcome of a current processing step cannot influence which processing step is performed next. An exemplary application field that strongly profits from the use of such conditionally bound processing control of a processor is the analysis of the control flow of CPUs within an SoC. A simple example for a scenario, in which the outcome of a processing step determines the following processing step, comprises evaluating whether or not a data value is below a predefined threshold and, only if it does lie below the predefined threshold, storing the data value in a memory. The EPU of the present invention does enable such conditionally bound processing control. The processing-control stage performs its flag-processing operation using the one or more ALU-result flags provided by the ALU in association with the ALU-result data. An ALU results flag indicates predefined arithmetic-logical status information associated with the ALU-result data. Thus, the processing-control stage of the EPU is enabled to flexibly control an upcoming next processing step, taking into account the ALU-result data and the ALU result flag(s), which have been provided as a result of a current processing step performed by the ALU.

The invention thus extends the applicability of the dataflow processor architecture to data processing problems that require a selection of a next processing step depending on a result of a previous processing step. The event processing unit is configured to process such a non-deterministic processing scheme through an input of the ALU results flag into the event processing stage. The event processing stage is configured to decide which processing steps are taken next based on, among others, the ALU results flag.

In the following, embodiments of the event processing unit will be described.

Some embodiments of the EPU in accordance with the present invention do not exchange ALU result data with external devices and therefore are not configured to generate outgoing tokens.

However, in many application cases, it is advantageous to communicate processing results of the EPU to one or more external devices. In embodiments of the event-processing unit suitable for such application cases, the control information additionally comprises an outgoing token identifier for use in generating an outgoing token. Furthermore, the processing-control stage is configured, if instructed by the result of the flag-processing operation, to generate and provide the outgoing token, using the outgoing token identifier as the token identifier and the ALU-result data as the payload data of the outgoing token. Moreover, the event-processing unit comprises an output stage that is configured to output the outgoing token.

The EPU of this embodiment enables a communication of ALU-result data from the EPU to external devices. A simple example for an external device is a second EPU that forms a subsequent processing stage and processes the outgoing tokens of the EPU. Another example for an external device is a known data processing device such as a laptop computer. In such a scenario, it is advantageous that outgoing tokens are used to pass on the results of processing operations performed by the EPU.

In some variants of this embodiment, only one output port is present. In other variants of this embodiment of the event-processing unit, the output stage comprises a plurality of parallel output ports. These variants allow an output of outgoing tokens by the EPU to a plurality of external devices in parallel. In one implementation of these variants, the control information additionally comprises an output-port identifier indicative of that of the parallel output ports, which is to be used for outputting the outgoing token. Suitably, the processing-control stage is additionally configured to provide the output-port identifier in association with the outgoing token. Moreover, the output stage of these variants is configured to receive the output-port identifier and to output the outgoing token via the output port indicated by the output-port identifier.

In another variant of this embodiment, the data-processing stage comprises a token-identifier-modifying unit that receives the outgoing token identifier and the data provided by the data memory. Moreover, the token-identifier-modifying unit is configured to modify the received outgoing token identifier using the data and to provide the modified outgoing token identifier. This variant allows an execution of token-processing schemes in which the token identifier of the outgoing token is allowed to depend on the data generated in the previous processing of tokens. In one implementation of this variant, the control information additionally comprises a modification-operation information, which is indicative of a modification operation to be performed by the token-identifier-modifying unit. In this embodiment, the token-identifier-modifying unit receives the modification-operation information and performs a modification of the outgoing token identifier according to the modification-operation information using the data provided by the data memory. An advantage of this variant is that the modification operation performed by the token-identifier-modifying unit is customizable for each token identifier.

Among other use cases, the token-identifier-modifying unit can be used to realize a ring buffer. In such a scenario, a set of token identifiers are indicative of commands to store data in the data memory, each token identifier corresponding to a different memory address in the data memory. The token-identifier-modifying unit can then be used to circularly switch between the different token identifiers.

This functionality is useful to map high-level language constructs (e.g., TeSSLa) to the hardware.

In other embodiments of the event-processing unit, the processing-control stage comprises a programmable flag memory, which is configured to store one or more state flags indicative of a current state of one or more predefined conditions. Such predefined current states are for example associated with one or more conditions that relate to states or state changes of an external device, or to operations performed by an external device. As a more specific example, a given state flag may be indicative of whether or not a predetermined token or, in another example, predetermined payload data has been identified by the EPU among the received incoming tokens as being received by the EPU from a specific external device.

In more general terms, state flags are advantageous to store those states or state changes of an external device that can be represented with a single bit. The state flags are advantageously stored in the flag memory, which is optimized to store a set of state flags.

This functionality is useful to map high-level language constructs (e.g., TeSSLa) to the hardware.

Preferably, in this embodiment, the control information additionally comprises a flag-read identifier indicative of a flag-memory address to read from in the flag memory or a flag-write identifier indicative of a flag-memory address to write to in the flag memory. Moreover, the flag memory is configured, upon receiving a flag-read identifier, to provide that state flag which is associated with the flag-memory address. Furthermore, the processing-control stage is configured to perform, additionally using the state flag provided by the flag memory, the flag-processing operation indicated by the flag-operation information, and to write the result of the flag-processing operation into the flag memory at the flag-memory address indicated by the flag-write identifier.

In a variant of this embodiment, that is advantageous in particular for enabling an initial configuration of the flag memory, the processing-control stage comprises a data interface for receiving from an external source a data set comprising flags in respective association with associated flag-memory addresses, and to store the received data of the data set in the flag memory at the respective associated flag-memory addresses. Suitably, the processing-control stage is additionally configured to output the data currently comprised in the flag memory, preferably in association with the respective flag-memory addresses, via the data interface to an external device.

In a further embodiment of the event-processing unit, the data-processing stage comprises an identifier-modifying unit. The identifier-modifying unit receives the data-write identifier included in the control information and the data provided by the data memory upon reception of the data-read identifier. Furthermore, the identifier-modifying unit is configured to perform a modification of the data-write identifier using the data-write identifier and the data, and to provide a modified data-write identifier indicative of a result of the modification. The processing-control stage receives the modified data-write identifier and is configured to, depending on the result of the flag-processing operation, write the ALU-result data to the data memory at the data-memory-address indicated by the modified data-write identifier.

This embodiment enables dynamic modifications in the execution of token-processing schemes by the data-processing stage which involve a write operation to the data memory. A "standard" data-write identifier that is associated with the write operation in accordance with the control information provided by the command memory is in this embodiment allowed to be dynamically changed in dependence on data provided by the memory in response to reception of a data-read identifier. Such data may depend on the processing result of a previously processed token and are thus subject to dynamic change in the course of the processing.

In a variant of this embodiment, the control information additionally comprises a modification-operation information, which is indicative of a modification operation to be performed by the identifier-modifying unit for modifying the data-write identifier. In this embodiment, the identifier-modifying unit receives the modification-operation information and performs a modification of the data-write identifier according to the modification-operation information using the data provided by the data memory as a parameter. As a simple illustrative example, the modification-operation information can be indicative of a mathematical subtraction operation, and the data provided by the data memory will be used as an operand that defines the value to be subtracted from the "standard" data-write identifier provided by the command memory.

With respect to hardware design, due to their similarity in function it is advantageous for corresponding embodiments to combine the identifier-modifying unit with the previously mentioned token-identifier-modifying unit into a single unit.

In a further embodiment of the event-processing unit, the ALU is configured to receive and extract a plurality of operands from the at least one incoming token. Furthermore, the control information stored in the command memory and provided by the next-command-computing stage additionally includes an ALU-operand-selection information. The ALU-operation-selection information is indicative of those operands from the operands received by the ALU, which are to be selected by the ALU for performance of the arithmetic-logical-processing operation indicated by the ALU-operation information. Furthermore, the ALU receives the ALU-operand-selection information and is configured to perform the arithmetic-logical-processing operation indicated by the ALU-operation information on those operands indicated by the ALU-operand-selection information.

In advantage of this embodiment is that is allows a selective processing of payload data provided by tokens that comprise, besides operands to be processed by the ALU, other data that is relevant for the processing of the token in other contexts. An example of such other data in an incoming token is a sequence indicator that specifies a point in time associated with a generation of the incoming token relative to a reference point in time. Whereas the sequence indicator according this example does not require processing by the ALU, other operands comprised by the incoming token are to be processed by the ALU and thus are to be selected according to the ALU-operand-selection information for performing the arithmetic-logical-processing operation indicated by the ALU-operation information.

In another embodiment of the event-processing unit the next-command-computing stage is configured to receive and extract from the at least one incoming token a sequence indicator that specifies a point in time associated with a generation of the incoming token relative to a reference point in time.

Furthermore, the next-command-computing stage comprises a token register for temporarily storing the incoming token. The next-command-computing stage further comprises a current-sequence-indicator register for storing a current sequence indicator, which is the sequence indicator associated with the command identifier last provided to the command memory.

Moreover, the next-command-computing stage comprises a before-sequence-indicator-change memory, herein BSIC memory, for storing command identifiers which point to that control information which is to be processed before the current sequence indicator stored in the current sequence indicator register is changed.

In this embodiment, the control information additionally comprises a second command identifier, and BSIC-write-selection information indicative of whether either the second command identifier or the ALU-result data is to be selected as a BSIC-memory input. Furthermore, the processing-control stage comprises a BSIC-write controller, which is configured to receive the BSIC-write-selection information, to select the BSIC-memory input indicated therein, and, depending on the result of the flag-processing operation, to write the selected BSIC-memory input to the BSIC memory.

Moreover, the next-command-identifier-computing unit is additionally configured, upon determining that the sequence indicator of the incoming token differs from the current sequence indicator stored in the current sequence indicator register, and before forwarding the respective command identifier allocated to the token identifier of the incoming token to the command memory,
  (i) to forward to the command memory any second command identifiers stored in the BSIC memory, for processing of the associated command information by the processing stage, and to subsequently remove the forwarded second command identifiers from the BSIC memory, and
  (ii) to subsequently set the current sequence indicator in the current-sequence-indicator register to the sequence indicator of the incoming token.

Furthermore, the next-command-identifier-computing unit is configured to forward the respective command identifier allocated to the token identifier of the incoming token to the command memory.

This embodiment allows token-processing schemes that comprise processing steps that are to be executed before processing an incoming token whose sequence indicator differs from the sequence indicator of the previously processed token. Such token-processing schemes are based on an order of sequence indicators in a stream of incoming tokens. They can, as a simple application example, be used to execute a data operation if a specific token was not received during a time period that ends with the change of the current sequence indicator. This functionality is used to map high-level language constructs (e.g. the known Temporal Stream-based Specification Language TeSSLa) to the hardware.

Preferably, the BSIC memory is implemented as a FIFO. Before the BSIC memory is not empty, the next command identifiers are read from the BSIC FIFO.

An implementation of the forwarding and processing performed in the context of step (i) will further below be described in more detail and referred to as a fetch-and-process routine ("fetch_and_proc").

In another embodiment of the event-processing unit, which can be applied either in alternative or in combination with the foregoing embodiment related to the BSIC memory, the next-command-computing stage is configured, as described before, to receive and extract from the at least one incoming token a sequence indicator that specifies a point in time associated with a generation of the incoming token relative to a reference point in time. Furthermore, the next-command-computing stage comprises a token register for temporarily storing the incoming token. The next-command-computing stage further comprises a current-sequence-indicator register for storing a current sequence indicator, which is the sequence indicator associated to the command identifier last provided to the command memory.

Moreover, however, in this embodiment, the next-command-computing stage comprises an after-sequence-indicator-change memory, herein ASIC memory, for storing command identifiers which are indicative of that control information which is to be processed after the current sequence indicator stored in the current-sequence-indicator register has been changed to the sequence indicator of the incoming token.

The control information additionally comprises a second command identifier, and ASIC-write-selection information indicative of whether either the second command identifier or the ALU-result data is to be selected as an ASIC-memory input.

Furthermore, the processing-control stage comprises an ASIC write controller, which is configured to receive the ASIC-write-selection information, to select the ASIC-memory input indicated therein, and, depending on a result of the flag-processing operation, to write the selected ASIC-memory input to the ASIC memory.

Moreover, the next-command-identifier-computing unit is additionally configured upon determining that the sequence indicator of the incoming token differs from the current sequence indicator stored in the current-sequence-indicator register, before forwarding the respective command identifier allocated to the token identifier of the incoming token to the command memory,
  (i) to set the current sequence indicator in the current sequence indicator register to the sequence indicator of the incoming token,
  (ii) to forward to the command memory any second command identifiers stored in the ASIC memory, for processing of the associated command information by the processing stage, and to subsequently remove the forwarded second command identifiers from the ASIC memory and Furthermore, the next-command-identifier-computing unit is configured to subsequently forward the respective command identifier allocated to the token identifier of the incoming token to the command memory.

An advantage of this embodiment of the event-processing unit is that it allows the execution of token-processing schemes that comprise processing steps that have to be executed after a sequence indicator and before the first token with a different sequence indicator has been processed.

This functionality is used to map high-level language constructs to the hardware.

Preferably, the ASIC memory is implemented as a FIFO. Until the ASIC FIFO is not empty, the next command identifier is read from the ASIC memory and is processed according to a fetch-and-process routine under step (ii) above.

As mentioned, some embodiments of the event-processing unit comprise the ASIC memory and the BSIC memory and implement the corresponding respective functionalities in combination. In these embodiments, however, the token register, the current sequence indicator, and the second command identifier comprised by the control information are only implemented once and thus are shared in use.

In another embodiment of the event-processing unit, which can be applied either in alternative or in combination with each of the foregoing embodiments related to the BSIC memory and the ASIC memory as well as to their combination, the next-command-computing stage is configured to receive and extract from the at least one incoming token a sequence indicator that specifies a point in time associated with a generation of the incoming token relative to a reference point in time. Furthermore, the next-command-computing stage comprises a token register for temporarily storing the incoming token.

The next-command-computing stage further comprises a current-sequence-indicator register for storing a current sequence indicator, which is the sequence indicator associated to the command identifier last provided to the command memory.

Moreover, the next-command-computing stage comprises a sequence-indicator-change memory, herein SIC memory, for storing command identifiers and associated sequence indicators, which command identifiers are indicative of that control information which is to be processed when the sequence indicator of the incoming token is equal or larger to the value of the sequence indicator of the respective associated command identifier stored in the SIC memory. Furthermore, the control information additionally comprises a second command identifier.

The processing-control stage comprises a SIC write controller, which is configured, if instructed by the result of the flag-processing operation, to generate as the ALU result data and write to the SIC memory the generated sequence indicator in association with the second command identifier.

Moreover, the next-command-computing unit is additionally configured upon determining that the sequence indicator of the incoming token differs from the current sequence indicator stored in the current-sequence-indicator register, before forwarding the respective command identifier allocated to the token identifier of the incoming token to the command memory,
  (i) for each of those stored sequence indicators and associated second command identifiers, for which the stored sequence indicator is less or equal to the sequence indicator of the incoming token, in an order of the sequence indicators associated to the second command identifiers,
    to set the current sequence indicator in the current-sequence-indicator register to the stored sequence indicator and to forward the associated command identifier to the command memory, and
    to remove the stored sequence indicator and the associated command identifier from the SIC memory;
  (ii) to set the current sequence indicator in the current-sequence-indicator register to the sequence indicator of the incoming token; and Furthermore, the next-command-computing unit is configured to forward the respective command identifier allocated to the token identifier of the incoming token to the command memory.

This embodiment of the event-processing unit allows the execution of token-processing schemes that require the execution of processing steps at a specific point in time. They can, as a simple application example, be used to generate a predefined sequence of tokens. This functionality is also used to map high-level language constructs to the hardware.

In another preferred embodiment of the event-processing unit, a given control information comprises a next command identifier indicative of that command identifier which is to be forwarded next to the command memory after the processing of the given control information by the processing stage is completed.

In this embodiment, the command memory is configured, upon reception of the command identifier from the next-command-identifier-computing unit, to provide the next command identifier included in the control information associated with the received command identifier to the next-command-identifier-computing unit.

Moreover, the next-command-identifier-computing unit, upon reception of the next command identifier, is configured to forward the next command identifier to the command memory before forwarding any other command identifier to the command memory.

This embodiment allows the execution of token-processing schemes in which the processing of a token requires multiple read or write operations to the data memory.

In a further embodiment of the event processing unit, the data-processing stage comprises a token-identifier-modifying unit that receives the outgoing token identifier and the data provided by the data memory, and that is configured to modify the received outgoing token identifier using the data and to provide the modified outgoing token identifier. Suitably, in variants of this embodiment, the control information additionally comprises token-modification-operation information, which is indicative of a modification operation to be performed by the token-identifier-modifying unit for modifying the token identifier. In such variants, the command-identifier-modifying unit receives the modification-operation information and performs a modification of the token identifier according to the modification-operation information using the data provided by the data memory as a parameter.

In other embodiments, the data-processing stage comprises a command-identifier-modifying unit that receives a given one of the command identifiers included in the control information and the data provided by the data memory, and that is configured to modify the given command identifier using the data and to provide the modified given command identifier. Suitably, in variants of this embodiment, the control information additionally comprises modification-operation information, which is indicative of a modification operation to be performed by the command-identifier-modifying unit for modifying the command identifier. In such variants, the command-identifier-modifying unit receives the modification-operation information and performs a modification of the data-write identifier according to the modification-operation information using the data provided by the data memory as a parameter.

In many application cases, parallel input from a plurality of different external sources is processed. In embodiments of the event-processing unit suitable for such application cases, the input stage comprises a plurality of parallel input ports, and for each input port a temporary-input-port memory. The temporary-input-memory receives a given incoming token from a respective given input port and is configured to temporarily store the given incoming token, hereinafter referred to as temporarily-stored incoming token. Moreover, the input stage comprises an input-selector unit that receives the temporarily-stored incoming tokens from the temporary-input-port memories and is configured to select, based on a predetermined selection scheme, one of the temporarily-stored incoming tokens and to forward the selected one of the temporarily-stored incoming tokens to the next-command computing stage.

Further advantages are achieved in variants combining the additional features of this embodiment with those embodiments comprising either the ASIC memory or the BSIC memory or the SIC memory or with embodiments comprising any combination of these three memories In one such a variant, the processing-control stage is additionally configured, if indicated by the result of the flag-processing operation, to provide the current sequence indicator as a threshold sequence indicator indicative of a threshold (e.g., maximum, but other implementations of the threshold are possible) allowable sequence indicator for enabling a forwarding of the incoming token by the input selector. Moreover, the input selector additionally is configured to refrain from forwarding those incoming tokens from at least one of the input ports to the next-command-computing stage, which have a sequence indicator of an amount ranging beyond the threshold, e.g. are larger than that of the threshold sequence indicator. An advantage of this variant is that it enforces an ordering of the processed tokens according to their sequence indicator value even if the tokens originate from different devices.

In a further variant of this kind, the input stage additionally comprises an input-port-blocking unit, which comprises a blocking-sequence-indicator register for storing the threshold sequence indicator. Furthermore, the processing-control stage is configured, if instructed by the result of the flag-processing operation, to activate a blocking-sequence-indicator signal. Moreover, the input-port-blocking unit receives the current sequence indicator from the current-sequence-indicator register and the blocking-sequence-indicator signal, and is configured to set the value of the blocking-sequence-indicator register to the value of the current sequence indicator when the blocking-sequence-indicator signal is activated. The input-port-blocking unit also receives the sequence indicator of the token that is forwarded from a temporary-input-port memory associated to the one of the number of input ports to the input selector. Furthermore, the input-port-blocking unit is configured to activate a blocking signal when the sequence indicator of the forwarded token is greater than the value of the threshold sequence indicator stored in the blocking sequence indicator register. The input selector receives the blocking signal and is configured to halt a forwarding of any tokens from the port for which the blocking signal is active to the next-command computing stage.

In another embodiment of the event-processing unit, the input stage comprises an input-port-blocking counter comprising a blocking-counter register, which is initially set to zero. Furthermore, the processing-control stage is additionally configured, if instructed by the result of the flag-processing operation, to either activate a blocking-counter-increment signal or a blocking-counter-decrement signal. The input-port-blocking counter receives the blocking-counter-increment signal and the blocking-counter-decrement signal and is configured to increment or decrement the value of the blocking-counter register, respectively, upon activation of one of the signals. Moreover, the input-port-blocking counter is configured to activate the blocking signal, when the value of the blocking-counter register is larger than zero and deactivate the blocking signal, when the value of the blocking-counter register is zero.

This functionality is used to map high-level language constructs to the hardware, especially recursive functions.

In an exemplary application, in which event-processing units are connected with each other in a linear chain, the input-port-blocking unit is used to stall the forwarding of tokens through the chain by blocking any tokens that have arrived through a predetermined input port from being forwarded. The stalling of the chain can be terminated by sending a token to a second input port that is not blocked.

In advantageous embodiments of the event-processing unit, the next-command-computing stage comprises a configuration interface for receiving command-set data from an external source and is configured to write the command-set data to the command memory.

This embodiment enables an initial configuration of the next-command computing stage as well as a reconfiguration of the command-set data through an external source.

In another embodiment of the event-processing unit, the data-processing stage comprises a data interface for receiving from an external source a data set comprising data in respective association with a data-memory address, and to store the received data in the data memory at the respective associated data-memory address. Moreover, the data-processing stage is configured to output the data comprised in the data memory via the data interface.

This embodiment enables initializing the data comprised in the data memory or an external reconfiguration. Moreover, the data interface allows extracting the processing results of the processing operations from the memory. In different variants of this embodiment, the data-processing stage is configured to output all data in the data memory, to output a selectable subset of the data comprised in the data memory.

In further embodiments of the event-processing unit suitable for providing output data to a plurality of different external devices, the output stage comprises a plurality of parallel output ports. The control information comprises an output-port identifier indicative of that of the parallel output ports, which is to be used for outputting the outgoing token. Furthermore, the processing-control stage is additionally configured to provide the output-port identifier in association with the outgoing token, and the output stage is configured to receive the output-port identifier and to output the outgoing token via the output port indicated by the output-port identifier.

The event-processing unit is particularly suited for forming an event processing cluster from a combination of a plurality of individual event processing units, to achieve a particularly high processing performance. An event-processing cluster according to the present invention comprises a plurality of event-processing units according to the present inventions or one of its embodiments in a serial or parallel configuration of event-processing units. A given event-processing unit is connected via its output stage to the input stage of any one or more further event-processing units.

Some embodiments of the event processing cluster form a linear chain of event processing units. In variants, an event processing cluster comprises two or more such linear chains of event processing units in parallel.

In preferred variants of such event-processing clusters the event-processing units are connected in a serial configuration, and a plurality of the event-processing units is connected to a respective associated set of one or more configurable switches. The output stage of a given one of the event-processing units is connected to the input stage of that event-processing unit, which is next-neighboring to the given event-processing unit in a forward direction of the serial configuration, or to the input stage of another event processing unit. Furthermore, any of the switches comprises at least two switch-input ports and at least two switch-output ports and a configurable set of connectors allowing a configurable connection between any selected one of the switch-input ports and any selected one of the switch-output ports. Moreover, for the given one of the event-processing units and a given one of the respective associated switches:
  (i) the output stage of the given event-processing unit is connected to one of the switch-input ports of the given switch,
  (ii) one of the switch-output ports of the given switch is connected with the input stage the given event-processing unit, and
  (iii) one of the switch-output ports is connected with one of the switch-input ports of one of the switches of the set of switches associated to that event-processing unit, which is next-neighboring to the given event-processing unit in a backward direction of a serial configuration or associated to another event-processing unit.

BRIEF DESCRIPTION OF THE DRAWINGS

Further embodiments will be described in the following with reference to the enclosed drawings. In the drawings.

DETAILED DESCRIPTION

In the following, an example of an application of an event-processing unit (EPU) will be discussed with reference to FIGS. 1-3. Afterwards, different embodiments of the EPU will be described with reference to FIGS. 4-21. Finally, different embodiments of a cluster of event-processing units, hereinafter also referred to as event-processing cluster (EPC) will be discussed with reference to FIGS. 22-24.

Figure 1:
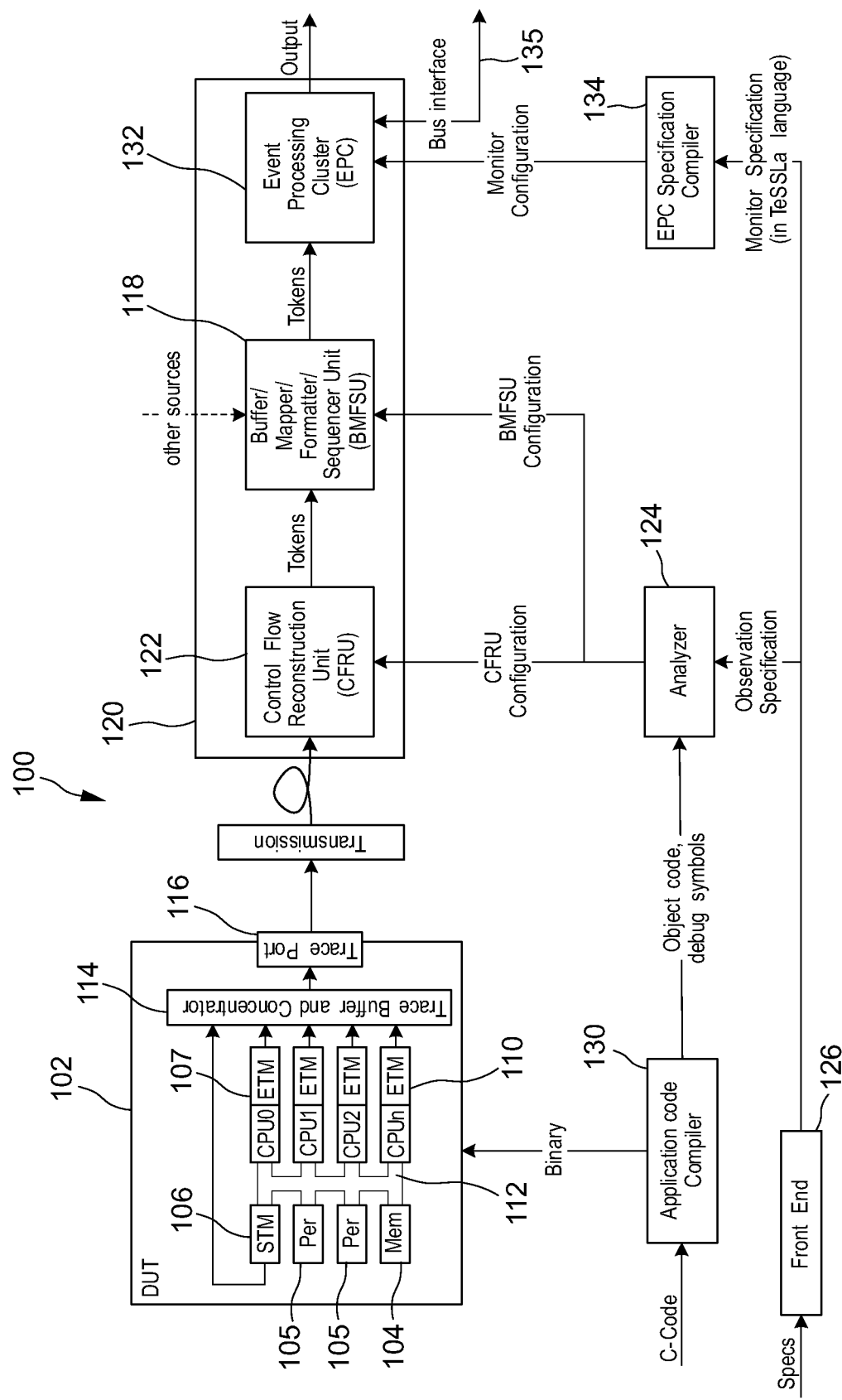
FIG. 1 is a block diagram of an exemplary setup comprising a device under test (DUD and a trace-processing device.
Figure 2:
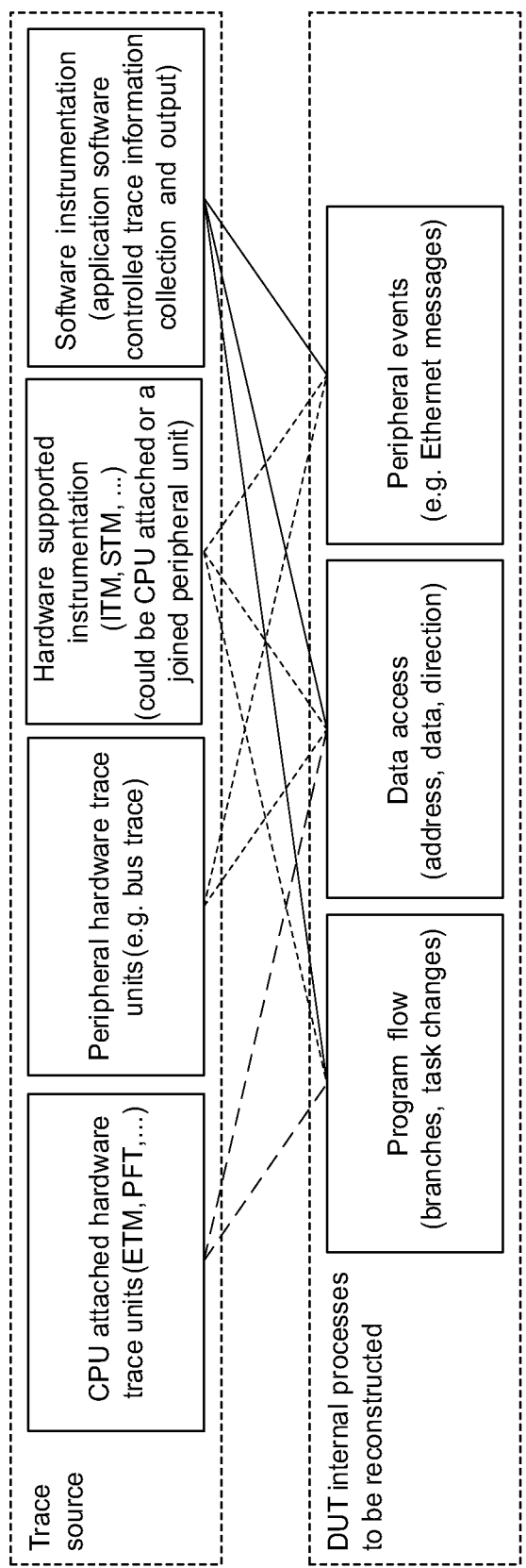
FIG. 2 is an illustration providing an overview of common trace sources used to observe the program execution of a given DUT.
Figure 3:
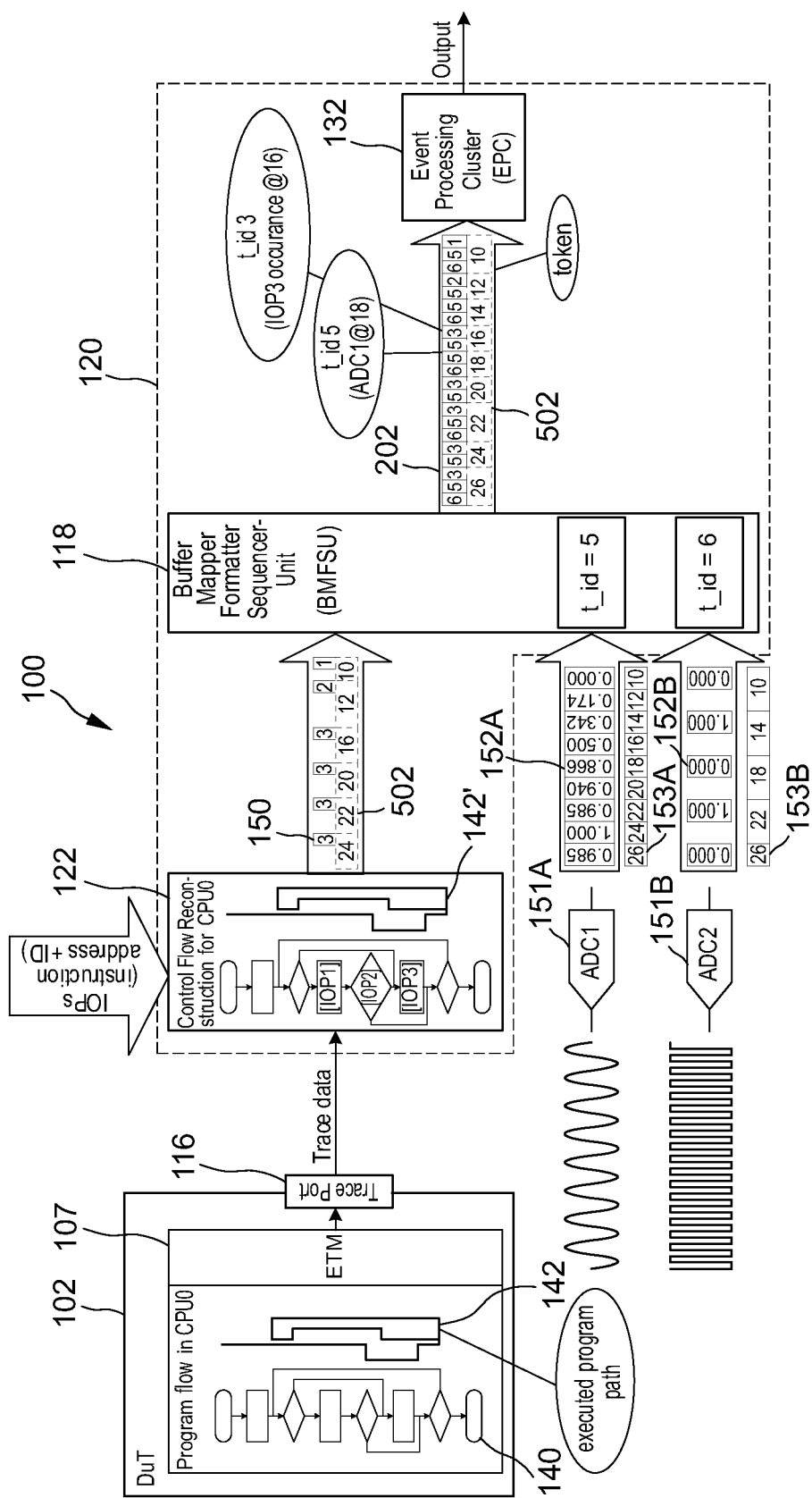
FIG. 3 is a functional overview of an exemplary interaction between the DUT and the trace-data-processing device including its individual components as shown in FIG. 1.

FIGS. 1-3 show an exemplary application of the EPU with regards to the analysis of trace data produced by a device under test or observation (DUT). FIG. 1 shows a block diagram of an exemplary setup 100 comprising a DUT 102 and a trace-processing device 120. The setup allows the analysis of the instructions executed by a program running on the DUT 102 through the analysis of its trace data.

In the present example, the DUT 102 is a multi-core system-on-chip (SoC) comprising a plurality of central processing units, hereinafter CPUs, four of which are shown for simplicity and labeled CPU0, CPU1, CPU2, CPUn, indicating that fewer or more than four CPUs may be present in different types of DUTs. The CPUs are connected with a memory 104 and peripheral devices, which are schematically summarized by the peripheral device blocks 105. Data communication between the memory 104, the periphery 105, and the CPUs is facilitated by a bus system 112. The program that runs on the DUT 102 can be written in any programming language. In the present embodiment, the program is written in a version of the C programming language, compiled using an application code compiler 130, and then uploaded to the DUT 102 via an input (not shown) to introduce executable binary code into the DUT 102.

To observe execution of instructions by the program running on a given DUT, various trace sources may be used. FIG. 2 is an illustration providing an overview of common trace sources that are commonly used to observe program execution of the given DUT:
  a CPU-attached hardware trace unit,
  a peripheral hardware trace unit,
  hardware supported instrumentation, and
  software instrumentation.

The first three sources require a specific hardware implementation in the DUT, while software instrumentation solely requires the instrumentation of the source code or binary code of the executed program. Moreover, the different types of trace sources monitor different aspects of the program execution, as is also illustrated in FIG. 2. For example, the program flow (e.g., branches or task changes) are monitored by the CPU-attached hardware trace unit, the hardware supported instrumentation and the software instrumentation, but not by the peripheral hardware trace unit. Yet, the peripheral hardware trace units allow for an observation of the data access and peripheral events.

In different variants of the DUT 102, various combinations of the four different trace sources are used. The variant of the DUT 102 shown in FIG. 1 comprises CPU-attached hardware trace units 107-110 and hardware supported instrumentation realized through a special trace unit 106. The DUT 102 shown in FIG. 1 is realized in an ARM architecture. The CPU-attached hardware trace units 107-110 are realized in the form of an ARM-specific embedded trace macrocell ETM and the special trace unit 106 in the form of an ARM-specific system trace macrocell STM. However, other DUTs are realized in other architectures or with other components.

The CPU-attached hardware trace units 107-110 are associated to each CPU, while the special trace unit 106 is attached to the bus 112. A trace buffer and concentrator 114 collects the generated trace data from all three sources, and uses it to form a trace data stream that is output via a trace port 116. The trace data stream is then forwarded to the trace-data-processing device 120 for an instant analysis.

The trace-data-processing device 120 is used to analyze the trace-data stream and comprises a control-flow-reconstruction unit (CFRU) 122, a buffer/mapper/formatter/sequencer unit (BMFSU) 118, and an event-processing cluster (EPC) 132, which comprises a plurality of EPUs. The CFRU 122 of the trace-data-processing unit 120 is configured to receive the trace-data stream produced by the DUT 102 and reconstruct a control-flow of the program executed by the DUT 102. For those trace data produced by CPU-attached hardware trace units, the reconstruction involves a decompression of the highly compressed trace-data stream. Subsequently, the information of the reconstructed control flow is provided to the BMFSU 118 in form of tokens. The BMFSU 118 is configured to combine the tokens received from the CFRU 122 with information from other sources that provide information about the working of the DUT 102 into a single stream of tokens that is received by the EPC 132, where the tokens are analyzed. To meet the requirements of the analysis of the trace-data stream, the CFRU 122, the BMFSU 118, and the EPC 132 are configured externally through a front end 126.

Through the front end 126, configuration specifications, labeled Specs in FIG. 1, are received. The configuration specifications comprise an observation specification and a monitor specification.

The observation specification determines which instructions of the program executed by the DUT 122 are relevant for the control-flow reconstruction performed by the CFRU 122. One part of the observation specifications is formed by instruction observation points (IOPs). The IOPs mark relevant instructions in the object code whose execution or non-execution (i.e., skipping) by the DUT 102 is to be observed by the CFRU 122. To this end, the observation specifications are fed into an analyzer 124, where the observation specifications are combined with the object code and any relevant debug symbols from the compiler 130 to form a CFRU configuration. In the process, each IOP is assigned a unique IOP identifier (IOPID) that allows the IOP to be distinguished from any other IOP. Moreover, the analyzer 124 creates from the observation specification a BMFSU configuration, which comprises information about how the BMFSU 118 is to merge the output of the CFRU 118 with information received by the BMFSU 118 from other sources. Finally, the monitor specification is used to determine how the EPC 132 processes the incoming stream of tokens. For use with the variant of the trace-data-processing device 120 shown in FIG. 1, the monitor specification may be given in the known Temporal Stream-based Specification Language (TeSSLa), which is compiled by an EPC-specification compiler 134 to generate a monitor configuration, which is subsequently uploaded to the EPC 132. TeSSLa is a stream-based specification language designed for specifying and analyzing the behavior of cyber-physical systems (CPS). Examples of CPS include smart grid power systems, autonomous automobile systems, medical monitoring systems, process control systems, robotics systems, and automatic pilot avionics. In other variants of the EPC 132 other suitable languages are used.

Besides the possibility to configure the EPC 132 using the configuration specification, it is also possible to access the CFRU 122, the BMFSU 118, and the EPC 132 and any individual EPUs comprised therein using a bus interface 135. The bus interface may be used to read and write any relevant memories.

In the following, a more detailed overview of the functional interplay between the DUT 102 and the trace-data-processing device 120 including its components the CFRU 122, the BMFSU 118, and the EPC 132 will be given with reference to FIG. 3.

FIG. 3 is an illustration conveying a functional overview of an exemplary interaction between the DUT 102 and the trace-data-processing device 120 including its individual components as shown in FIG. 1. The central-processing unit CPU0, hereinafter referred to in short by only the reference label "CPU0", of the DUT 102 executes a computer program whose individual instructions are represented schematically by a flow chart 140 shown within the box representing the DUT 102 in FIG. 3. FIG. 3 also shows an order in which the DUT 102 executes the instructions comprised in the flow chart 140 symbolized by an executed program path 142 shown on the right-hand side of the flow diagram 140. During program execution, the CPU-attached hardware trace unit 107, in this example a program flow trace PFT, sends a trace-data stream identifying the executed instructions through the trace port 116 to the CFRU 122 of the trace-data-processing device 120.

Based on the trace data and the object code of the program, which is included in the CFRU configuration, the CFRU 122 generates a reconstructed program path 142' that forms a reconstruction of the executed program path 142. Since the information contained in the trace-data stream generated by the CPU-attached hardware trace unit is very dense, it is often advantageous to analyze not all executed instructions, but only those that are relevant for respective application and marked with an IOP, which are part of the CFRU configuration. If an instruction marked with an IOP is executed or skipped, depending on the configuration, a message, hereinafter also referred to as a token, is created, wherein the associated IOPID is used as a token identifier 150, which indicates the event that led to the creation of the token. Subsequently, the token is forwarded to the BMFSU 118. The stream of tokens forwarded from the CFRU 122 to the BMFSU 118 is indicated by the arrow connecting the two units in FIG. 3.

Besides the token identifier, each token created by the CFRU 122 also comprises a sequence indicator 502. The sequence indicator is a value that specifies a point in time associated with the occurrence of the event that lead to the creation of the token relative to at least one other point in time associated with an occurrence of one or more other events. The sequence indicator is particularly useful in those scenarios where different sources of trace data are merged into a single trace-data stream to establish an order between the trace data provided by different trace sources. In a non-limiting example, the merged data is used to identify race conditions. If a granularity of event sequence indices represents a constant time span, the sequence indicator corresponds to a timestamp.

FIG. 3 only depicts the forwarding of trace data from the CPU-attached hardware trace unit 107, representative for all CPU-attached hardware trace units 107-110, to the trace-data-processing device 120. However, trace data from peripheral hardware trace units, hardware supported instrumentation or from software instrumentation may also be processed by the trace-data-processing device 120. Since the trace data from those latter trace sources is provided in a less compressed form in comparison with the trace data from the CPU-attached hardware trace units 107 to 110, a control flow reconstruction is not required. Instead, the CFRU 122 assigns a sequence identifier to the trace data as it arrives, buffers the trace data, and forwards it together with the tokens in a single stream, sorted by sequence identifier, to the BMFSU 118. The BMFSU 118 then further processes the data. In another variant, the trace data from the peripheral hardware trace units, the hardware supported instrumentation, and the software instrumentation bypasses the CFRU 122 and is directly connected to the BMFSU 118. In this variant, the BMFSU 118 is configured to assign a token identifier and a sequence indicator to the data and consolidate the streams of trace data from the different trace data sources into a single stream of tokens.

Other data sources that do not provide tokens can also be connected to the BMFSU 118. In the example shown in FIG. 3, the BMFSU 118 is also connected to two analog-to-digital converters labeled (and referred to in the following as) ADC1 and ADC2. Analog-to-digital converters may be used in recording any analog signal, such as analog output signals and analog input signals of the DUT 102, which provide additional information for the analysis of the trace data. In the example shown in FIG. 3, the ADC1 and the ADC2 each sample an analog signal and convert the analog signal into a data stream comprising sample values 152A and 152B and respective associated sequence indicators 153A and 153B. Subsequently, the BMFSU 118 receives the data streams from the ADC1 and the ADC2. In the example shown in FIG. 3, the BMFSU 118 maps each incoming sample value to the token identifier "t_id=5" for ADC1 and "t_id=6" for ADC2 and creates a token comprising the token identifier, the sequence indicator, and the sample value as payload data. In general, through proper BMFSU configuration, a different mapping scheme may be defined for each data source.

In a further step, the BMFSU 118 consolidates the input data streams received from the different data sources connected to the BMFSU 118. The consolidation is done by sorting and unifying the input streams according to their sequence indicator into a single stream of tokens. In variants, where the BMFSU 118 is connected to input sources that do not provide a sequence indicator, the BMFSU 118 first assigns sequence indicators to the incoming data. In a last step, the BMFSU 118 prepares the consolidated stream of tokens for output. The stream of tokens is forwarded as an input to the EPC 132.

In the example of FIG. 3, only the CFRU 122 and the two analog-to-digital converters ADC1 and ADC2 are connected to the BMFSU 118. However, it is also possible to connect additional sources to the BMFSU 118. In another variant, the BMFSU 118 is also connected to external bus analyzers that examine the data stream on a bus, e.g. a CAN bus or an Ethernet bus, and forward any relevant information to the BMFSU 118 for incorporation into the trace data analysis.

This variant is particularly advantageous for monitoring a communication through the CAN bus between different CPUs of a multicore processor. If also the different cores of the multicore CPUs are attached to the BMFSU 118, an emission of a message by one of the CPUs, a transmission through the CAN bus as well as a reception of the message by another CPU can potentially be observed. In yet another variant, the BMFSU 118 is also connected to other sources of data, e.g., digital input data.

In another variant, the BMFSU 118 is additionally configured to buffer the input data streams. In such variants, the BMFSU 118 either comprises or has otherwise access to a memory unit, where data can be written to or read from.

In yet another variant of the BMFSU 118, the BMFSU 118 comprises a number of outputs different from that shown in FIG. 3, depending on the respective implementation of the EPC 132. Which tokens are forwarded to which output stream is determined by the user in the observation specification.

After the foregoing description of a possible application of the EPU as part of an EPC in the context of the analysis of trace data, in the following, a more detailed description of the EPU will be given with reference to FIGS. 4-21. The following description of the EPU will not be limited to a configuration for a particular application, but rather to a general processing of tokens associated with a state or state transition, herein also referred to as an event, that occurs in an external DUT.

Figure 4:
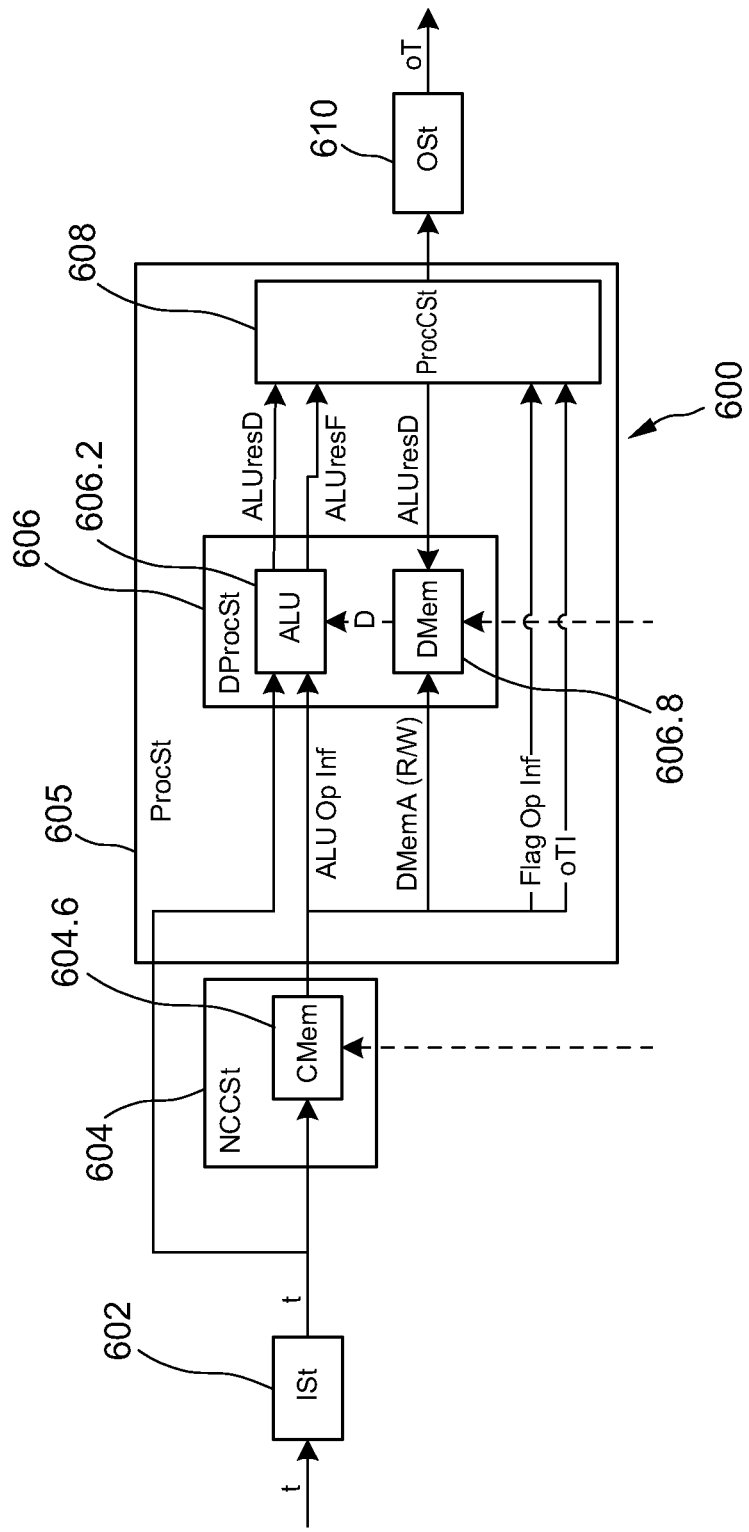
FIG. 4 is a block diagram of an embodiment of an event-processing unit (EPU) for processing tokens associated with a state or state transition of an external device.

FIG. 4 shows an embodiment of an EPU 600 for processing tokens associated with a state or state transition of an external device. The EPU comprises an input stage 602, which is configured to receive at least one incoming token, the incoming token carrying a token identifier indicative of one event from a predetermined set of events, and payload data.

Moreover, the EPU 600 includes a next-command-computing stage 604 that receives the incoming token from the input stage 602. The next-command-computing stage 604 comprises a command memory 604.6 that allocates to a predetermined set of token identifiers a set of command identifiers. Furthermore, the command memory 604.6 comprises command-set data that allocates to the set of command identifiers control information comprising at least ALU-operation information indicative of an arithmetic-logical-processing operation to be performed, and a data-read identifier indicative of a data-memory address to read from in a data memory or a data-write identifier indicative of a data-memory address to write to in the data memory, and flag-operation information indicative of a flag-processing operation to be performed.

Moreover, the command memory 604.6 is configured to provide the control information associated with the token identifier of the incoming token.

The EPU 600 further comprises a processing stage 605, which is configured to receive and process the control information from the next-command-computing stage 604 and the incoming token. The processing stage 605 comprises two stages: a data-processing stage 606 and a processing-control stage 608.

The data-processing stage 606 comprises the data memory 606.8, which is configured to provide data, which is stored under the data-memory address indicated by the data-read identifier, upon reception of the data-read identifier. Furthermore, the data-processing stage 606 comprises an arithmetic-logic unit 606.2, referred to as ALU. The ALU 606.2 receives the data provided by the data memory 606.8, the payload data of the incoming token, and the ALU-operation information, and is configured to perform the arithmetic-logical-processing operation indicated by the ALU-operation information using the data or the payload data as operands. Furthermore, the ALU 606.2 is configured to provide ALU-result data indicative of a result of the arithmetic-logical-processing operation, and to provide one or more ALU-result flags indicative of predefined arithmetic-logical status information associated with the ALU-result data.

The processing-control stage 608 receives the flag-operation information, the ALU-result data, and the ALU-result flag, and is configured to perform the flag-processing operation indicated by the flag-operation information using the ALU-result flag. Moreover, the processing-control stage 608 is configured, if instructed by a result of the flag-processing operation, to write the ALU-result data to the data memory 606.8 under the data-memory address indicated by the data-write identifier.

The EPU 600 is implemented using an FPGA, ASIC or ASSP. In some variants, a single FPGA, ASIC or ASSP implements not only the EPU 600, but also other logical circuits such as the DUT 102 or parts thereof.

As was described with reference to FIGS. 1-3 and FIG. 4, the EPU is configured to receive and process tokens associated with a state or state transition of an external device. In the following, different embodiments of tokens in accordance with embodiments of the presented invention will be described with reference to FIGS. 5-7.

Figure 5:
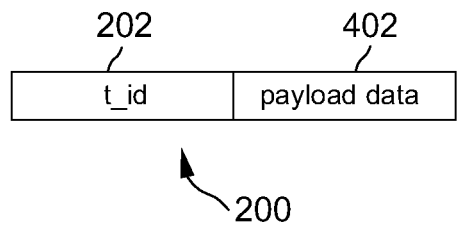
FIG. 5 is an illustration of a first exemplary token that comprises a token identifier and payload data.

FIG. 5 shows a token 200 that comprises a token identifier 202 and payload data 402. The token identifier 202 is indicative of the event that lead to the creation of the token. Moreover, the token identifier 202 is used by the EPU 600 to determine how the token 200 is to be processed. The token identifier is comprised within all embodiments of the token. Besides the token identifier 202, all tokens further comprise payload data 402. Payload data contains additional data related to the event that lead to the creation of the token. While the EPU 600 shown in FIG. 4 is primarily configured to process tokens that only consist of a token identifier and payload data, other embodiments of the token exist that comprise additional information.

Figure 6:
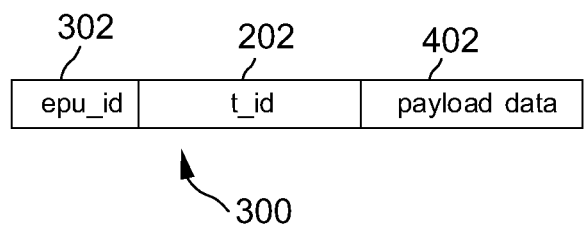
FIG. 6 is an illustration of a second exemplary token comprising a token identifier, payload data, and, additionally, an EPU identifier.

FIG. 6 shows a token 300 comprising a token identifier 202, payload data 402, and, additionally, an EPU identifier 302, also referred to as "epu_id". In applications where a plurality of connected EPUs are used, like in the case of the EPC 132 shown in FIG. 1, the EPU identifier 302 corresponds to an address, which is used to direct a token to a specific EPU. Furthermore, specific values of the EPU identifier 302 can be used to address groups of EPUs or broadcast tokens to all EPUs. In another variant of the token, it is also possible to encode the EPU identifier 302 within the token identifier 202.

Figure 7:
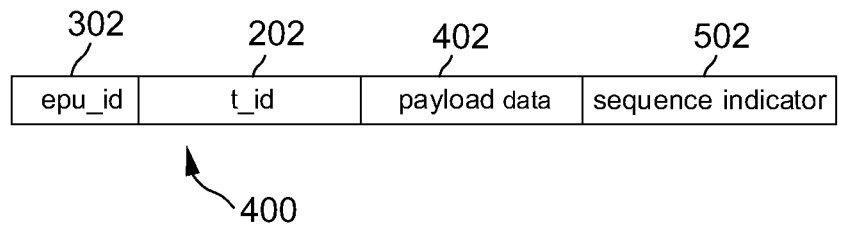
FIG. 7 is an illustration of a third exemplary token comprising a token identifier, payload data, an EPU identifier, and, additionally, a sequence indicator.

FIG. 7 shows a token 400 comprising a token identifier 202, payload data 402, an EPU identifier 302, and, additionally, a sequence indicator 502, hereinafter also referred to as "si", wherein the sequence indicator carries time information related to the event that caused the creation of the token 400. In the token 400 shown in FIG. 7, every token comprises a sequence indicator 502. However, in other variants of the token, sequence indicators are only comprised in selected tokens. An example of such a variant is shown in FIG. 8.

Figure 8:
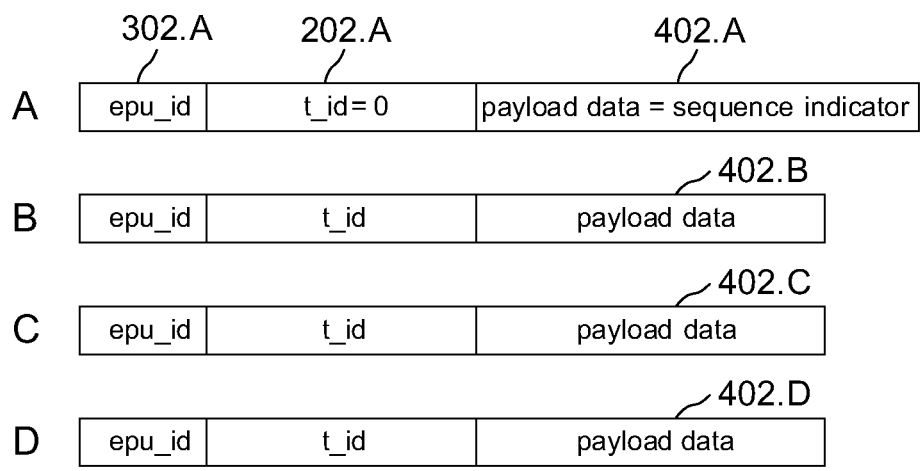
FIG. 8 is an illustration of a stream of tokens.

FIG. 8 shows a stream of tokens 500 comprising 4 tokens labeled "A", "B", "C", and "D", respectively. Each of those tokens comprises a token identifier 202$x$, an EPU identifier 302$x$, and payload data 402$x$, wherein "x" indicates one of the letters "A", "B", "C", or "D". In the stream of tokens shown in FIG. 8, a sequence indicator is transmitted through the payload data rather than a separate attribute in the data structure of the tokens. This concept is exemplary shown for token A. To enable that EPU, which is processing the stream of tokens, to recognize the significance of the payload data of token A, the token identifier of that token is set to a predetermined value. In the example shown in FIG. 8, the predetermined value is "0". Moreover, the EPU is configured to use the sequence indicator comprised in the payload data 402A of token "A" for all incoming tokens following token "A" until a second token comprising a sequence indicator is encountered. Using the outlined structure of the stream of tokens and the therein comprised tokens, information comprising a sequence indicator and one or more payload data related to a single event can be transmitted. Furthermore, if multiple events are associated with the same sequence indicator, the sequence indicator only has to be transmitted once.

The different variants of tokens shown in FIGS. 5-8 are only examples. Other variants exhibit a data structure comprising combinations of the data structures as corresponding attributes shown in FIG. 5-8.

The EPU 600 discussed with reference to FIG. 4 is particularly suited to process tokens carrying a token identifier and payload data. However, in technical applications, like the trace-data processing discussed initially, tokens comprising a sequence indicator have to be processed. Therefore, in the following, an embodiment of an EPU 600' will be described that is configured to also process a given token or a stream of tokens comprising at least one sequence indicator. The EPU 600' will be discussed with reference to FIGS. 9-21.

Figure 9:
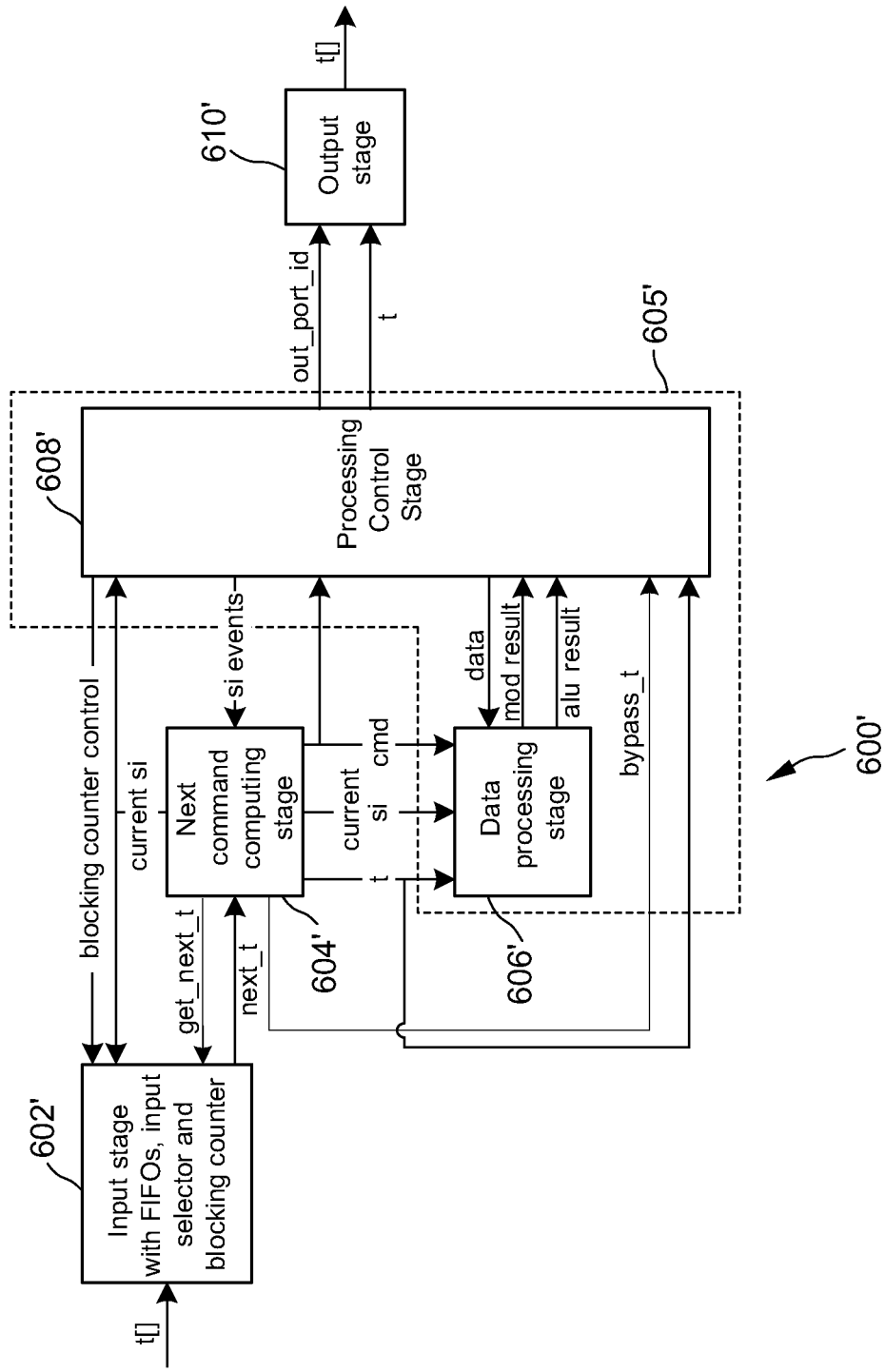
FIG. 9 is a block diagram of an embodiment of an EPU.

FIG. 9 shows a block diagram of an embodiment of an EPU 600'. The EPU 600' of FIG. 9 is advantageous over the EPU 600 shown in FIG. 4 for the EPU 600' allows to include the sequence indicator of the incoming token in the processing of the token. Moreover, the EPU 600' also allows to check arbitrary constraints of a respective sequence identifier of a given incoming token with respect to the sequence identifiers of one or more other incoming token included in the incoming stream of tokens. This ability to check arbitrary constraints is realized in the EPU 600' through processing the incoming stream of tokens in an ascending order of the sequence indicator of the incoming tokens and through the possibility to schedule processing steps to be executed at a selected point in time with respect to the sequence indicator of a processed token. How this is realized will be explained in the following with respect to FIG. 9.

FIG. 9 shows a block diagram of an embodiment of the EPU 600'. The EPU 600' comprises an input stage 602', a next-command-computing stage 604', a processing stage 605' including a data-processing stage 606', a processing-control stage 608', and an output stage 610'.

Through the input stage 602', the EPU 600' receives an incoming stream of tokens, labeled "t[ ]". A data structure of an incoming token from the incoming stream of tokens "t[ ]" comprises a token identifier, payload data, a sequence identifier, and, if the EPU 600' is part of a cluster of individually addressable EPUs, an EPU identifier. The input stage 602' is configured to buffer the incoming tokens. Moreover, if the input stage 602' comprises a plurality of input ports, the input stage 602' is configured to select which token of the incoming stream of tokens is to be forwarded for processing. Furthermore, if the input stage 602' comprises one or more so-called blocking counters, the selection of which token is to be processed next is also influenced by the processing-control stage 608'. Depending on a respective configuration, a given blocking counter prevents the forwarding of certain incoming tokens from those input ports that the blocking counter is associated to. The respective configuration of a given blocking counter is determined by the processing-control stage 608' through a signal labeled "blocking counter control". Upon receiving a signal labeled "get_next_t" from the next-command-computing stage 604', the input stage 602' is configured to provide a next token, labeled "next_t", to the next-command-computing stage 604'.

The next-command-computing stage 604' is configured to provide control information that is indicative of a command to be executed to process the next token "next_t" depending on a respective token identifier comprised in the token "next_t". Moreover, the next-command-computing stage 604' is also configured to receive and buffer information, labeled "si events", indicative of commands that are to be executed at a specific point in time with respect to the sequence indicator of the next token "next_t". Furthermore, the next-command-computing unit 604' is configured to determine which command is to be processed next by the processing stage. The respective control information, labeled "cmd", associated to that command is provided to the data-processing stage 606' and the processing-control stage 608'. If the command provided is used to process the next token "next_t", the next token "next_t" is also forwarded to the data-processing stage 606' as is indicated by a signal labeled "t".

To enable the execution of commands at a specific point in time with respect to the sequence indicator of the next token "next_t", the next-command-computing stage 604' is also configured to store a current sequence indicator, labeled "current si", indicative of the sequence indicator of the command last provided to the processing stage. Moreover, the next-command-computing stage 604' is configured to provide the current sequence indicator to the input stage 602' and the processing-control stage 608'. In variants of the EPU 600', the current sequence indicator is also provided to the data-processing stage 606' that is configured to use the current sequence indicator as an operand to perform arithmetical-logical operations.

If the EPU 600' is a part of a cluster of EPUs and the incoming token comprises an EPU identifier, then the next-command-computing stage 604' is also configured to determine based on the EPU identifier of the next token "next_t" if the next token "next_t" is to be processed by the EPU or another EPU. If the next token "next_t" is to be processed by another EPU, after the sequence indicator of the next token "next_t" has been processed by the next-command-computing stage 604', the next token "next_t" is provided to the processing-control stage 608' together with a signal, labeled "bypass_t", indicating that the next token "next_t" is to be forwarded to another EPU. The processing-control stage 610' forwards the next token "next_t" to the output stage, indicated by the signal labeled "t", together with control information, labeled "out_port_id", indicative of the destination of the next token "next_t".

After the next-command-computing stage 604' determined and provided to the processing stage 605' the control information "cmd" indicative of a command to be executed next, the data-processing stage 606' is configured to execute a part of the command that is related to data processing. Depending on the control information "cmd", the data-processing stage 606' is configured to read data from a data memory comprised in the data-processing stage 606' and perform arithmetic-logical operations. In variants of the EPU 600', the data-processing stage 606' is also configured to perform address-manipulation operations. A result of the arithmetic-logical operations and the address-manipulation operations is provided to the processing-control stage 608' indicated by the signal labeled "alu_result" and "mod_result", respectively.

The processing-control stage 608' is configured to perform flag-processing operations, provided in the control information "cmd", using the results of the arithmetic-logical operations or the address-manipulation operations. If instructed by a result of the flag-processing operations, the processing-control stage 608' is configured to write the results of the arithmetical-logical operations "alu result", indicated by the signal labeled "data", into the data memory comprised in the data-processing stage 606'. Moreover, the processing-control stage 608' is configured, if instructed by the results of the flag-processing operation, to provide the next-command-computing stage 604' with those commands, labeled "si events", that are to be executed at a specific point in time with respect to the sequence indicator of the next token "next_t".

Moreover, the processing-control stage 608' is configured, if instructed by the result of the flag-processing operations, to prepare an outgoing token to be output based on the result "alu_result" and "mod_result" of the arithmetic-logical operations and the address-modification operations, respectively. The processing-control stage 608' is configured to forward, indicated by the signal labeled "t", the outgoing token to the output stage 610' together with information about the output channel identifier of the outgoing token indicated by "out_port_id".

Also, the processing-control stage 608' is configured to set any blocking counters comprised within the input stage 602' indicated by the signal labeled "blocking counter control" to only allow the forwarding and processing of certain tokens of the incoming stream of tokens "t[ ]".

The next-command-computing stage 604', the data-processing stage 606', and the processing-control stage 608' are connected to a bus interface (not shown) that allows to upload the monitor configuration onto the individual stages. Furthermore, the bus interface provides read access to information stored in the various memories comprised by the three stages.

In the following, details of exemplary implementations of the stages comprised within the EPU 600' will be described with reference to the FIGS. 10-21. The description starts with a detailed description of the input state 602'. For components of the EPU 600' that are also part of the EPU 600, the same reference numbers are used.

Figure 10:
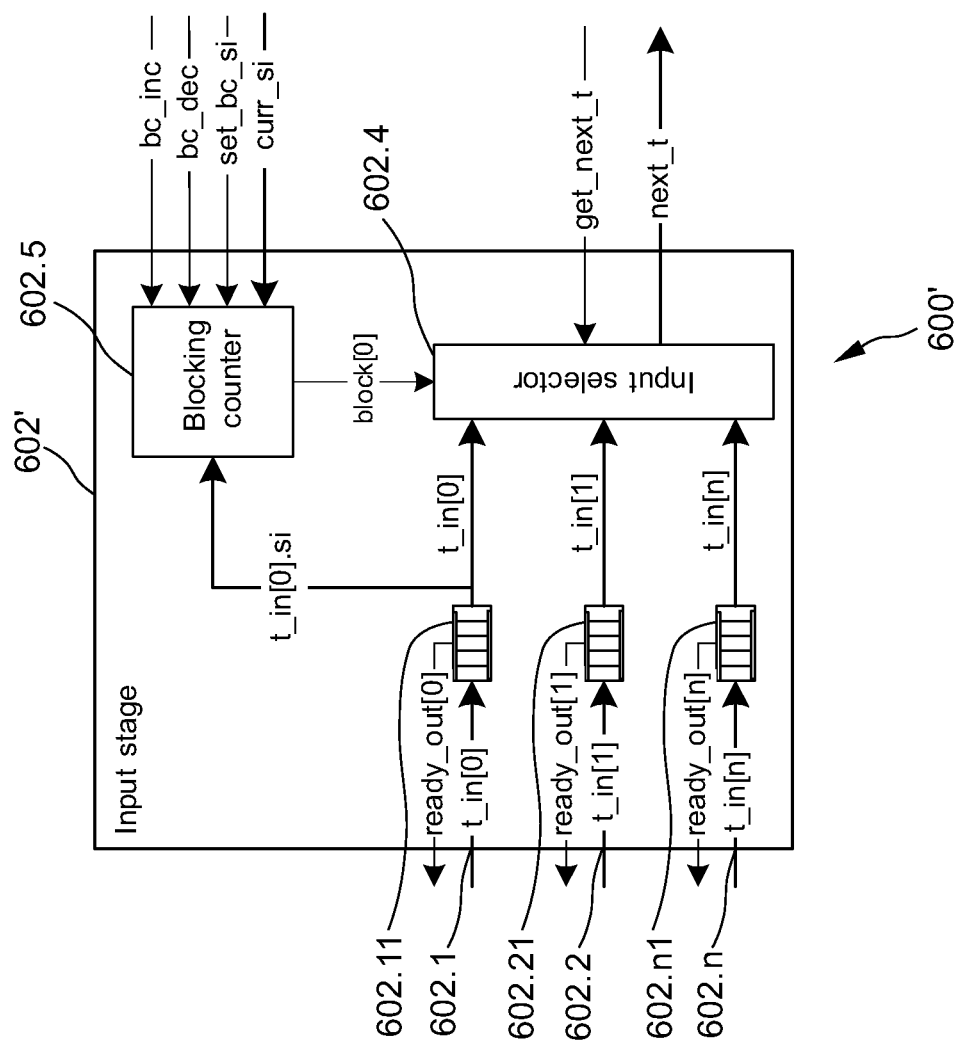
FIG. 10 is a block diagram of a variant of an input stage of the EPU of FIG. 9.

FIG. 10 shows a block diagram of a variant of the input stage of the EPU of FIG. 9.

The input stage 602' receives the incoming stream of tokens "t[ ]" via three input ports labeled 602.1, 602.2, and 602.n. The label "n" indicates that variants of the EPU 600' also comprise a number of input ports that is larger or smaller than three. The streams of tokens reaching the input ports 602.1, 602.2, and 602.n are labeled "t_in[0]", "t_in[1]", and "t_in[n]", respectively.

The input ports 602.1, 602.2, and 602.n are each equipped with a FIFO 602.11, 602.21, and 602.n1, respectively. Furthermore, each FIFO 602.11, 602.21, and 602.n1 comprises a handshaking mechanism indicated by the label "ready_out[0]", "ready_out[1]", and "ready_out[n]", respectively. The handshaking mechanism prevents overflows of the FIFOs, wherein the ready signal "ready_out" output by the input stage 602' indicates to a sender of the respective stream of tokens that the respective input port is ready to receive the incoming token. In a variant of the EPU 600', input buffers are used instead of the FIFOs 602.11, 602, 21, and 602.n1.

In a variant, to increase efficiency, the different stages of the EPU 600' are implemented in form of a compute pipeline. In this variant, the content of the FIFOs 602.11, 602.21, and 602.n1 are restorable in case of a pipeline flush.

The signal received from the next-command-computing stage 604' labeled "get_next_t" indicates to the input stage 602' that the next-command-computing stage 604' is ready to receive another token for processing. Which token is forwarded, is determined by an input selector 602.4 and a blocking counter 602.5.

The input selector 602.4 is configured to selectively forward the tokens stored in the FIFOs 602.11, 602.21, and 602.n1 to the next-command-computing stage 604'. In the variant of the input stage 602' presented in FIG. 10, tokens received through the different input ports are forwarded based on different priorities assigned to each input port. However, other variants of the input stage 602' are configured to selectively forward tokens from the different FIFOs based on a different scheme. In variants of the input stage 602', the input selector 602.4 is implemented in the form of an arbiter or a state machine. The input selector 602.4 is only present in those variants of the input stage 602' that comprise a plurality of input ports.

The blocking counter 602.5 associated to the input port 602.1 is used to control the forwarding of incoming tokens of the input port 602.1 to the next-command-computing stage 604'. The blocking counter 602.5 receives the sequence indicator labeled "t_in[0]" of a first token, which was first received by the FIFO 602.11 and is stored in the FIFO 602.11, and is configured to indicate to the input selector 602.4 through a signal labeled "block[0]", whether or not the first token stored in the FIFO 602.11 may be forwarded to the next-command-computing stage 604'. In the variant of the input stage 602' shown in FIG. 10, the blocking counter 602.5 is configured to only forward the stored first token under the following conditions: The blocking counter 602.5 only allows the forwarding of the stored first token if a value of a blocking-counter register comprised in the blocking counter 602.5 is set to zero. If a value of the blocking-counter register comprised in the blocking counter 602.5 is set to non-zero, the blocking counter 602.5 only allows the first token to be forwarded if the sequence indicator "t_in[0].si" of the first token is smaller or equal to a blocking-counter sequence indicator stored in a blocking-counter-sequence-indicator register comprised in the blocking counter 602.5. The value of the blocking-counter-sequence-indicator register and the blocking-counter register are determined through a number of signals labeled "bc_inc", "bc_dec", "set_bc_si", and "curr_si" which the blocking counter 602.5 receives from the processing-control stage 608. Those signals are described in more detail in Tab. 1.

TABLE 1

Signals received by the blocking counter 602.5

| Signal | Direction | Description |
| --- | --- | --- |
| curr_si | in | Indicates the current sequence indicator to the blocking counter 602.5 |

TABLE 1-continued

Signals received by the blocking counter 602.5

| Signal | Direction | Description |
| --- | --- | --- |
| set_bc_si | in | Controls the storage of the current sequence indicator "curr_si" as the blocking-counter sequence indicator |
| bc_inc | in | Control signal to increment the blocking counter value |
| bc_dec | in | Control signal to decrement the blocking counter value |

In FIG. 10, only one blocking counter 602.5, associated to the input port 602.1, is shown. However, in variants of the input stage 602', a plurality of blocking counters each associated to a different input port is present. In yet another variant of the input stage 602', at least one blocking counter is associated to a plurality of input ports. Moreover, in another variant of the input stage 602, the blocking counter 602.5 implements different conditions for forwarding a token than the ones mentioned above.

Once the input selector 602.5 determined the next token "next_t", the next token "next_t" is forwarded to the next-command-computing stage 604'. A further processing of the next token "next_t" by the next-command-computing stage 604' will be explained in the following with reference to FIGS. 11-14.

Before describing the next-command-computing stage 604' of the EPU 600' shown in FIG. 9, the next-command-computing stage 604 of the EPU 600 shown in FIG. 4 will be explained for comparison.

Figure 11:
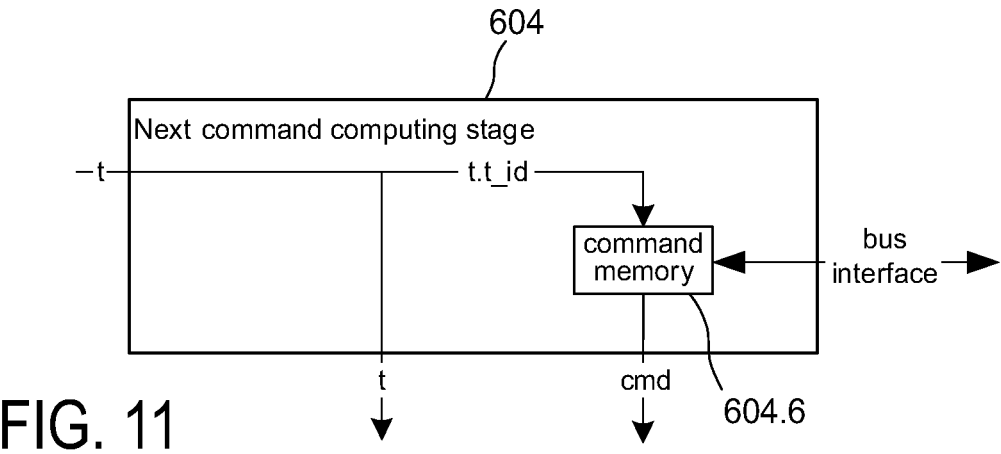
FIG. 11 is a block diagram showing more detail of a next-command-computing stage of the EPU of FIG. 4.

FIG. 11 shows a block diagram of the next-command-computing stage 604 as comprised by the EPU 600 of FIG. 4. The task of the next-command-computing stage 604 of FIG. 11 is to provide the respective control information required for processing the incoming token "t". To this end, the next-command-computing state 604 is configured to receive the token "t" and forward the token identifier "t.t_id" comprised in the token "t" to the command memory 604.6. The command memory 604.6 is configured to determine the corresponding command identifier of the token identifier "t.t_id". Moreover, the command memory 604.6 is also configured to determine and provide the control information "cmd" corresponding to the determined command identifier.

Figure 12:
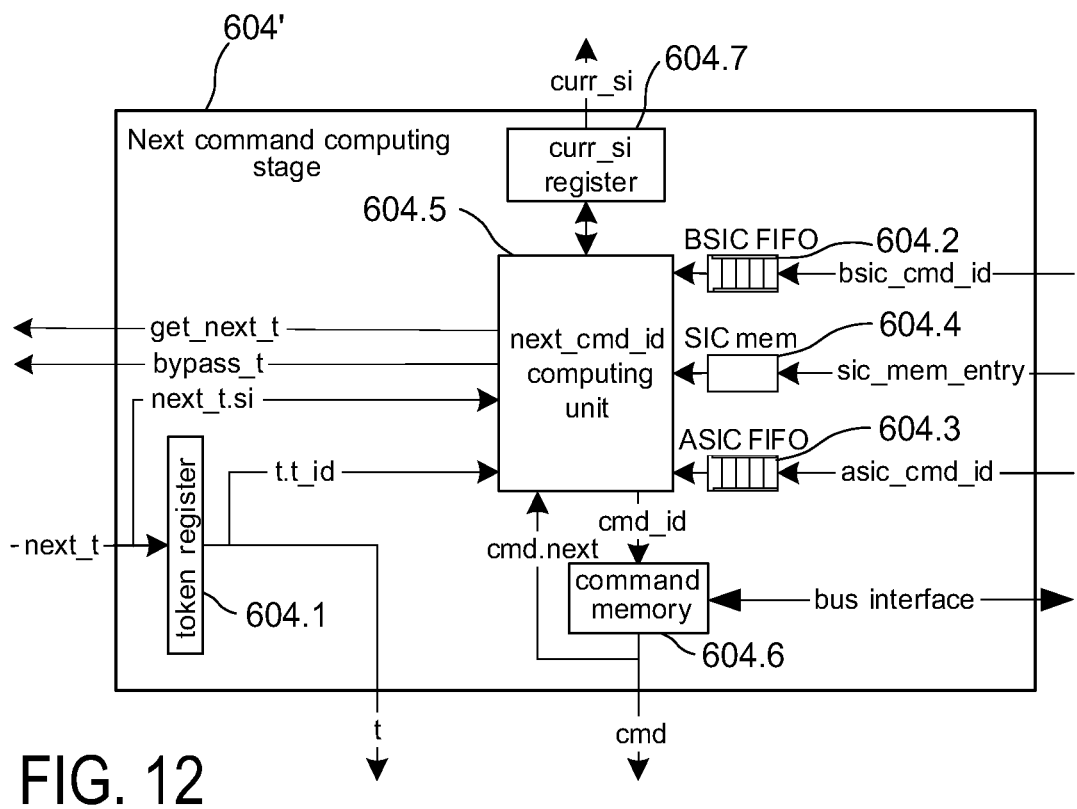
FIG. 12 is a block diagram of a variant of a next-command-computing stage of the EPU of FIG. 9.

FIG. 12 shows a block diagram of an exemplary implementation of the next-command-computing stage 604' suitable for use in the EPU 600'. In comparison to the next-command-computing stage 604 shown in FIG. 11, the next-command-computing-stage 604' shown in FIG. 12 is particularly suited to process tokens that, besides the token identifier and payload data, also comprise a sequence indicator and, optionally, an EPU identifier.

As has already been described with regard to FIG. 9, the EPU 600' does not only provide for the execution of commands to process the incoming token, but also allows commands to be scheduled for an execution at a selected point in time with respect to the sequence indicator of a currently processed token. The scheduling is done by the next-command-identifier-computing unit 604.5.

The next-command-identifier-computing unit 604.5 receives the sequence indicator "next_t.si" of a next token, labeled "next_t", which is that token that is selected by the input stage 602' to be forwarded next to the next-command-computing stage 604'. The next-command-identifier-computing unit 604.5 requests the next token using the signal "get_next_t" from the input stage 602'. Subsequently, the next-command-computing stage 604' receives the next token "next_t" from the input stage 602'. Furthermore, the next-command-computing stage 604' temporarily stores the next token "next_t" in a token register 604.1. While a token "t" is stored in the token register, the properties of the token are accessible by the data-processing stage 606' indicated by the arrow labeled "t". Moreover, the token identifier "t.t_id" of the stored token "t" is accessible to the next-command-identifier-computing unit 604.5. Additionally, the next-command-identifier-computing unit 604.5 allocates to a predetermined set of token identifiers a set of command identifiers and provides, upon reception of a token identifier, the corresponding command identifier. It is noted that in the variant of the EPU 600' described here, token identifiers and their corresponding command identifiers are identical. However, this is a non-limiting exemplary implementation. In other variants, token identifiers and their associated command identifiers are not identical.

Furthermore, the next-command-identifier-computing unit 604.5 receives command identifiers from a before-sequence-indicator-change (BSIC) FIFO 604.2, a sequence-indicator-change (SIC) memory 604.4, and an after-sequence-indicator-change (ASIC) FIFO 604.3, which are explained in more detail in Tab. 2. The next-command-identifier-computing unit 604.5 is configured to determine using the sequence indicator "next_t.si", the applicable source of the three possible sources of scheduled commands, and a current-sequence-indicator register 604.7 used to store a current sequence indicator, which is that sequence indicator associated to the command last executed, which command identifier will be send to the command memory 604.6 next. In the following, processing steps taken by the next-command-identifier-computing unit 604.5 to determine the next command to be executed will be described with reference to FIGS. 13-14.

TABLE 2

| Name | Description |
|---|---|
| Description of the BSIC FIFO, the ASIC FIFO, and the SIC memory. | |
| before-sequence-indicator-change (BSIC) FIFO 604.2 | The BSIC FIFO 604.2 stores command identifiers indicative of commands to be executed before the current sequence indicator is updated. If a given command identifier stored in the BSIC FIFO 604.2 has been executed, the given command identifier is removed from the BSIC FIFO 604.2. Command identifiers are added to the BSIC FIFO 604.2 by the processing-control stage 608'. |
| sequence-indicator-change (SIC) memory 604.4 | The SIC memory 604.4 is used to store command identifiers, labeled "sic_list[ ].cmd_id", and associated sequence indicators, labeled "sic_list[ ].si". The entries are to be executed in ascending order with respect to their sequence indicators, i.e., the smallest sequence indicator first, if the sequence indicator "next_t.si" of a next token "next_t" is larger than or equal to a respective sequence identifier associated to a given command identifier stored in the SIC memory 604.4. If a given command identifier was executed, the given command identifier together with the associated sequence indicator is removed from the SIC memory 604.4. Command identifiers and their associated sequence indicators are added to the SIC memory 604.4 by the processing-control stage 608'. |
| after-sequence-indicator-change (ASIC) FIFO 604.3 | The ASIC FIFO 604.3 stores command identifiers indicative of commands to be |

TABLE 2-continued

| Name | Description |
|---|---|
| Description of the BSIC FIFO, the ASIC FIFO, and the SIC memory. | |
| | executed immediately after the value of the current sequence indicator was changed. If a given command identifier stored in the ASIC FIFO 604.3 has been executed, the given command identifier is removed from the ASIC FIFO 604.3. Command identifiers are added to the ASIC FIFO 604.3 by the processing-control stage 608'. |

Figure 13:
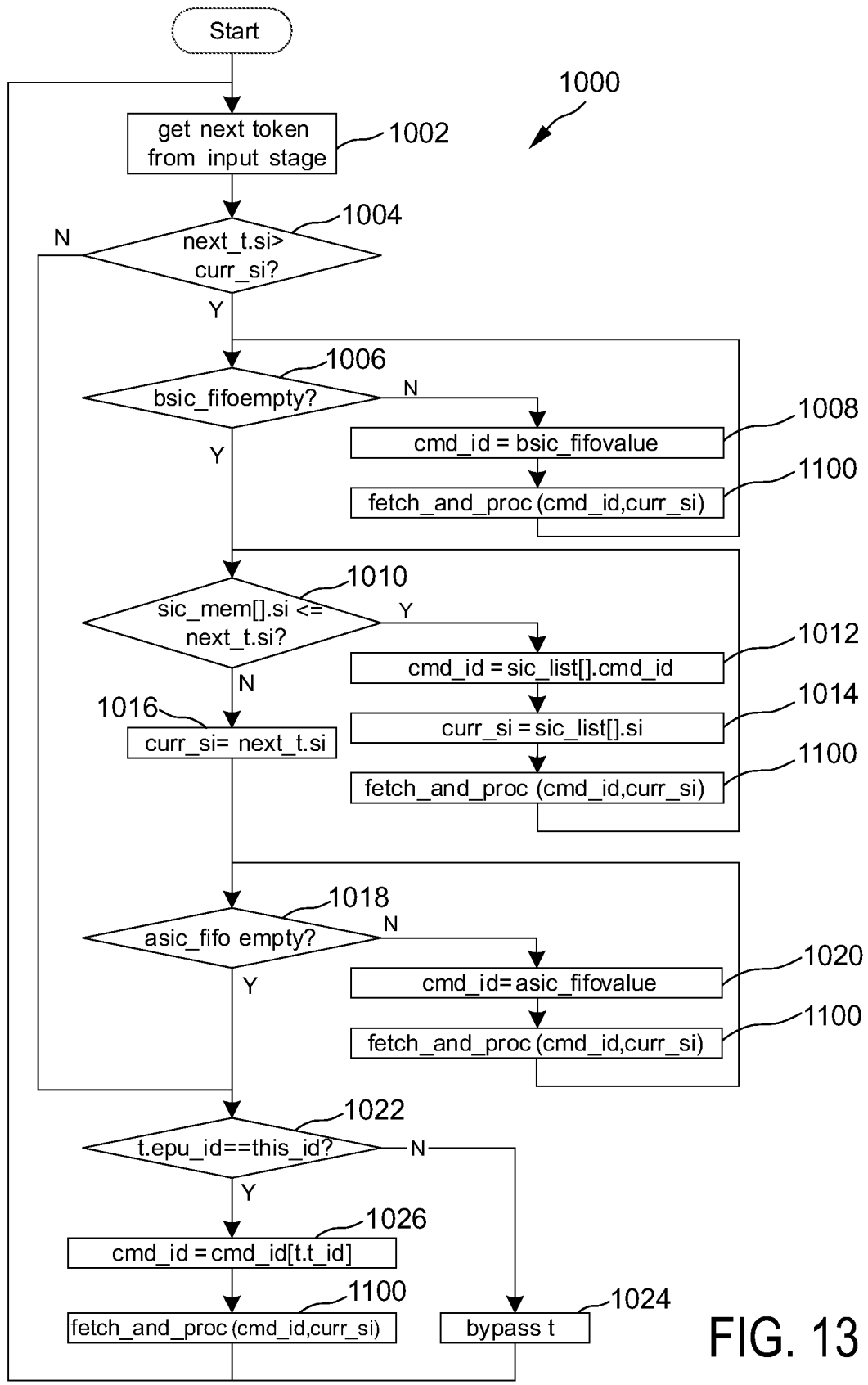
FIG. 13 is a flow diagram of processing steps performed by a next-command-identifier-computing unit of the next-command-computing stage of FIG. 12 in the course of determining a next command to be executed.

FIG. 13 is a flow diagram showing processing steps performed by the next-command-identifier-computing unit 604.5 in the course of determining the next command to be executed.

In a step 1002 labeled "get next token from input stage" in FIG. 13, the signal "get_next_t" is activated. It indicates to the input stage 602 to provide the next token "next_t" to the next-command-computing stage 604. After reception of the next token "next_t", the next token "next_t" is temporarily stored in the token register 604.1 and will be referred to in the following as stored token "t". While the stored token "t" is stored in the token register 604.1, its properties are accessible by the data-processing stage 606'. Furthermore, its token identifier "t.t_id" is accessible to the next-command-identifier-computing unit 604.5. Also, the sequence indicator "next_t.si" is provided to the next-command-identifier-computing unit 604.5.

In a step 1004 labeled "next_t.si>curr_si?", the current sequence indicator "curr_si" and the sequence indicator "next_t.si" of the next token "next_t" are compared. If the sequence indicator "next_t.si" of the next token "next_t" is larger than the sequence indicator "curr_si", the algorithm continues at a step 1006. If not, the algorithm continues at a step 1022.

In a step 1006 labeled "bsic_fifo_empty?", the next-command-identifier-computing unit 604.5 determines whether or not the BSIC FIFO 604.2 is empty. If it is not empty, the algorithm proceeds with a step 1008 labeled "cmd_id=bsic_fifo value", in which one of the command identifiers stored in the BSIC FIFO 604.2 is determined to be processed next and, in a step 1100 labeled "fetch_and_proc( )", dequeued from the BSIC FIFO 604.2 and processed using a routine labeled "fetch_and_proc( )", which receives the determined command identifier and the current sequence indicator as input parameters. After executing the routine "fetch_and_proc( )", the step 1006 is executed again.

If the BSIC FIFO 604.2 is found to be empty in the step 1006, in a step 1010 labeled "sic_mem[ ].si<=next_t.si?", the next-command-identifier-computing unit 604.5 determines whether the SIC memory 604.4 contains an entry with a sequence indicator which is equal to or smaller than the sequence indicator "next_t.si" of the next token "next_t". If the SIC memory 604.4 contains such an entry, a step 1012 is executed.

In the step 1012 labeled "cmd_id=sic_list[ ].cmd_id", that command identifier stored in the SIC memory 604.4 is determined whose associated sequence indicator is closest to the value of the current sequence indicator. In a subsequent step 1014 labeled "curr_si=sic_list[ ].si", the value of the current-sequence-identifier register is set to the value of the sequence identifier associated to the determined command identifier. In the step 1100 labeled "fetch_and_proc( )", the determined command identifier, and the associated sequence identifier, is removed from the SIC memory 604.4 and processed using the routine labeled "fetch_and_proc( )", which receives the determined command identifier and the current sequence indicator as input parameters. Subsequently, the processing returns to the step 1010.

If it was determined that the SIC memory 604.4 does not contain an entry with a sequence indicator value "sic_mem [ ].si" that is smaller than or equal to the sequence indicator "next_t.si" of the next token "next_t", the current sequence indicator value labeled "curr_si" is updated to the value of sequence indicator "next_t.si" in a step 1016 labeled "curr_si=next_t.si".

In a step 1018 labeled "asic_fifo_empty?", the next-command-identifier-computing unit 604.5 determines whether or not the ASIC FIFO 604.3 is empty. If it is not empty, the algorithm proceeds with a step 1020 labeled "cmd_id=asic_fifo value", in which one of the command identifiers stored in the ASIC FIFO 604.3 is determined to be processed next and, in the step 1100 labeled "fetch_and_ proc( )", dequeued from the ASIC FIFO 604.3 and processed using the routine labeled "fetch_and_proc( )", which receives the determined command identifier and the current sequence indicator as input parameters. After executing the routine "fetch_and_proc( )", the step 1018 is executed again.

If in the step 1018 it was determined that the ASIC FIFO 604.3 is empty or in the step 1004 it was determined that the sequence identifier "next_t.si" of the next token "next_t" is equal to the current sequence identifier, the stored token "t" in the token register 604.1 is subsequently processed.

Subsequently, in a step 1022 labeled "t.epu_id==this_id?", the next-command-identifier-computing unit 604.5 verifies whether the EPU identifier labeled "this_id" of the EPU performing the processing is equal to the EPU identifier "t.epu_id" of the stored token "t" being processed. If the EPU identifier are different (i.e., the token is not addressed to the given EPU), in a step 1024 the "bypass_t" signal is activated, which instructs the processing-control stage 608' to provide the stored token "t" to the output stage 610' without modifications.

In another variant of the EPU 600' that does not make use of EPU identifiers, the step 1022 and step 1024 are not comprised in the algorithm 1000. Moreover, the EPU identifier "t.epu_id" of the stored token "t" is not provided to the next-command-identifier-computing unit 604.5.

If the EPU identifiers match (i.e., the next token is addressed to the given EPU), in a step 1026 labeled "cmd_id=cmd_id[t.t_id]", the next-command-identifier-computing unit 604.5 receives the token identifier "t.t_id" of the stored token "t" and determines the associated command identifier "cmd_id[t.t_id]". Furthermore, in a step 1100, the command identifier "cmd_id[t.t_id]" is processed using the routine labeled "fetch_and_proc( )", which receives the command identifier "cmd_id[t.t_id]" and the current sequence indicator "curr_si" as input parameters. Afterwards, the algorithm returns to step 1002 to continuously process the tokens received by the input stage 602'.

As is depicted in FIG. 12, after the command identifier of the command to be processed next was identified, the next-command-identifier-computing unit 604.5 provides the command identifier, labeled "cmd_id", to a command memory 604.6. As the command memory 604.6 in FIG. 11, the command memory 604.6 of FIG. 12 also comprises for a predetermined set of command identifiers corresponding control information required for the execution of the command indicated by the command identifier. In Tab. 3, a summary of elements comprised in the control information is given, also referred to as control-information elements. Depending on the application that the EPU 600' is used in, not all entries of the control information given in Tab. 3 are required. In different variants of the EPU 600', the control information only comprises a subset of the entries given in Tab. 3. In other variants of the EPU 600', the control information comprises control-information elements that are not listed in Tab. 3. Moreover, for those elements of the control information that indicate a specific source of data, at least one bit is used to encode the specific source. For example, the element "cmd.bsic_sel" given in Tab. 3 uses two source bits to encode four source:

11 cmd.cmd_id[0],
10: cmd.cmd_id[1],
01: mod_result, and
00: alu_result.data.

However, in other variants of the EPU 600', other source information is encoded differently.

The command memory 604.6 can be pre-initialized via a bus interface or using tokens and their associated commands themselves. Moreover, the command memory 604.6 is configured, upon reception of a given command identifier, to provide that control information associated to the given command identifier and to forward that control information to the data-processing stage 606' and the processing-control stage 608'. The described interaction between the next-command-identifier-computing unit 604.5 and the command memory 604.6 is described by the "fetch_and_proc( )" routine shown in FIG. 14 in more detail, which will be described in the following.

Figure 14:
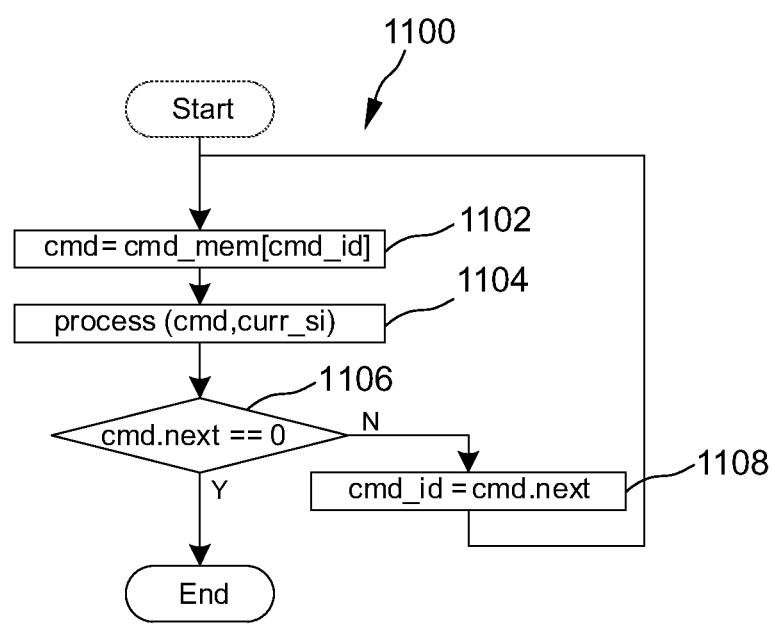
FIG. 14 is a flow diagram of processing steps performed to process a given command identifier.

FIG. 14 is a flow diagram showing processing steps taken to process a given command identifier. When executed, the "fetch_and_proc( )" routine 1100 receives a given command identifier "cmd_id" and the current sequence indicator "curr_si" as input parameters.

In a step 1102 labeled "cmd=cmd_mem[cmd_id]", the control information "cmd" corresponding to the given command identifier "cmd_id" is loaded from the command memory 604.6. A detailed description of the control information will be given later. In a subsequent step 1104 labeled "process(cmd, curr_si)", the control information "cmd" and the current sequence indicator "curr_si" are processed by the data-processing stage 606' and the processing-control stage 608', where the command corresponding to the control information is executed.

In a step 1106, the next-command-identifier-computing unit 604.5 determines if the control information of the given command identifier comprises a "cmd.next" control-information element whose value is different from zero. If the control information comprises at least one next command identifier, these next command identifiers will be processed as indicated by a step 1108 labeled "cmd_id=cmd.next". Only after all next command identifiers are processed, the "fetch_and_proc( )" routine terminates and returns control to the algorithm 1000. In another variant of the EPU 600', another pre-determined value different from "0" is used to indicate that no next command identifier is used.

The processing of any next command identifiers is also indicated in FIG. 12 with the arrow labeled "cmd.next" from the command memory 604.6 to the next-command-identifier-computing unit 604.5. In some variants of the EPU 600', the control information does not contain any next command identifiers. As a result, the arrow labeled "cmd.next" in FIG. 12 as well as the step 1106 and the step 1108 in FIG. 14 do not exist on those variants.

Furthermore, the BSIC FIFO 604.2, the SIC memory 604.4, and the ASIC FIFO 604.3 are optional elements of the next-command-computing stage 604. In other variants of the EPU 600', none or any combination of those elements are present in the next-command-computing stage 604'.

TABLE 3

Overview of control-information elements comprised in the control information, their function, and the stages where the respective control-information element is used.

| Element | Stages | Function |
|---|---|---|
| cmd.next | next-command-computing stage (next-command-identifier-computing unit) | If cmd.next is "0", the next token will be processed by the next-command-identifier-computing unit. If the cmd.next element is not "0", it points to one or more additional command identifiers, referred to as next command identifiers, which are to be processed immediately afterwards. |
| cmd.cmd_id[ ] | data-processing stage, system-control stage | List of command identifiers that can be used for various tasks. |
| cmd.alu_input_sel | data-processing stage | Input selection determining the operands of the ALU 606.2. |
| cmd.alu_op_sel | data-processing stage | Selects the operations of the ALU 606.2. |
| cmd.data_addr[ ] | data-processing stage | Data-read identifier indicative of data-memory address to be read from in the data memory 606.8. |
| cmd.flag_addr[ ] | processing-control stage | Flag-read identifier accessing the flag memory 608.4 of the system-control stage 608'. |
| cmd.flag_op_i_sel | processing-control stage | Addresses the flag-operation-identifier memory and selects a set of flag_op_ids for the flag processors 608.2 of the processing-control stage 608'. |
| cmd.bsic_sel | processing-control stage | If a write operation to the BSIC FIFO 604.2 is performed, the bsic_sel element determines the source from which the command identifier is taken.<br>00: cmd.cmd_id[0]<br>01: cmd.cmd_id[1]<br>10: mod_result<br>11: alu_result.data |
| cmd.asic_sel | processing-control stage | If a write operation to the ASIC FIFO 604.3 is performed, the asic_sel element determines the source from which the command identifier is taken.<br>00: cmd.cmd_id[0]<br>01: cmd.cmd_id[1]<br>10: mod_result<br>11: not used |
| cmd.sic_mem_sel | processing-control stage | If a write operation to the SIC memory 604.4 is performed, the cmd.sic_mem_sel element determines the source from which the command identifier is taken.<br>00: cmd.cmd_id[0]<br>01: cmd.cmd_id[1]<br>10: mod_result<br>11: not used |
| cmd.data_wr_sel[ ] | processing-control stage | If a write operation to the data memory 606.8 of the data-processing stage is performed, the data_wr_sel determines the source for the write operation. data_wr_sel contains a separate entry for each memory unit, if the data memory 606.8 comprises |

TABLE 3-continued

Overview of control-information elements comprised in the control information, their function, and the stages where the respective control-information element is used.

| Element | Stages | Function |
|---|---|---|
| | | a plurality of memory units.<br>0: mod_result<br>1: alu_result.data |
| cmd.out_identifier_sel | processing-control stage | If an outgoing token is prepared for output, the out_identifier_id_sel determines the source of the token identifier of the token.<br>00: cmd.cmd_id[0]<br>01: cmd.cmd_id[1]<br>10: mod_result<br>11: alu_result.data |
| cmd.out_port_id | processing-control stage | Port through which the outgoing token is output. |
| cmd.out_epu_id | processing-control stage | EPU identifier of the outgoing token. |

After the control information has been retrieved from the command memory 604.6 for a given command identifier, the control information is provided to the data-processing stage 606' together with any relevant information from the stored token "t". In the following, different variants of the data-processing stage 606' will be described with reference to FIGS. 15-18.

The FIGS. 15-18 show different variants of the data-processing stage 606'. All variants of the data-processing stage 606' are configured to perform arithmetic-logical operations and store data. To this end, all of the data-processing stages shown in FIGS. 15-18 possess an arithmetic-logical unit (ALU) 606.2, or 606.2', and a data memory 606.8. In the variants of the data-processing stage 606' shown in FIGS. 15-18, the data memory 606.8 comprises a plurality of parallel accessible memory units that allow a faster read and write access. However, in other variants, the data memory 606.8 comprises only a single memory unit. In the following, each of the variants shown in FIGS. 15-18 will be described in greater detail, wherein identical reference numbers in the FIGS. 15-18 indicate identical elements.

Figure 15:
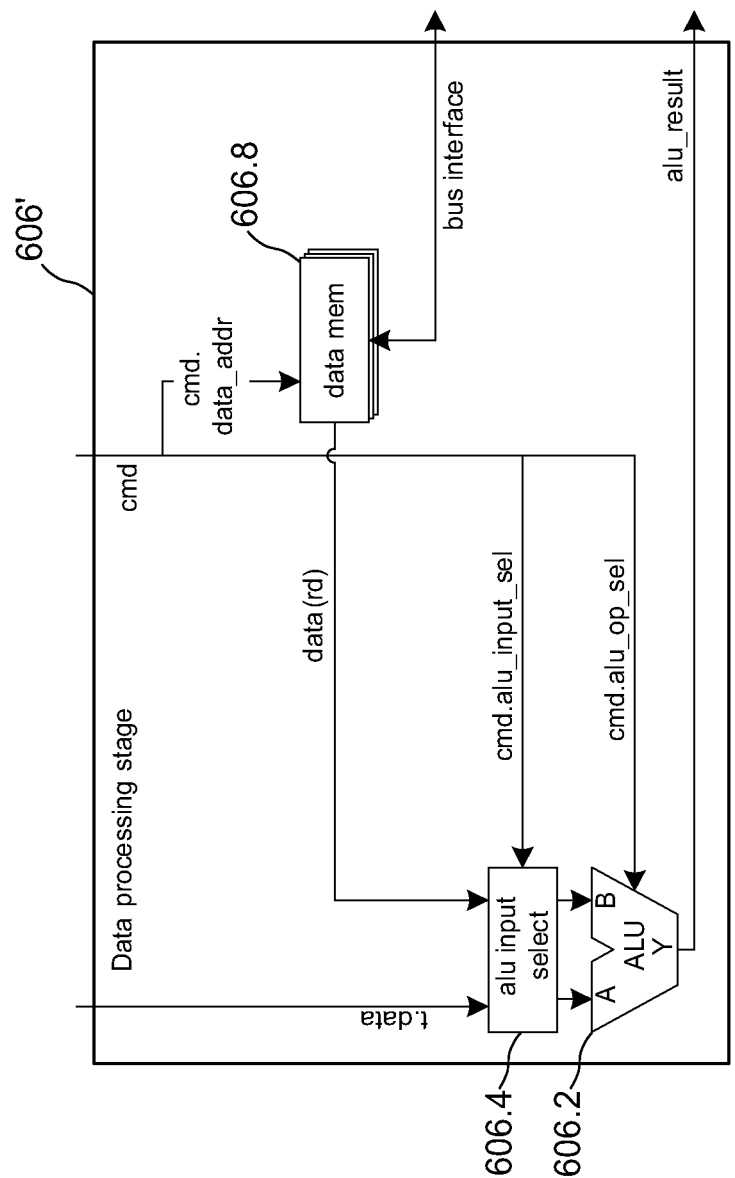
FIG. 15 is a block diagram of a variant of the data-processing stage of the EPU of FIG. 9 comprising an ALU and a data memory.

FIG. 15 shows a data-processing stage 606' of the EPU 600' of FIG. 9 comprising the ALU 606.2 and the data memory 606.8.

The data-processing stage 606' shown in FIG. 15 receives the stored token "t" and the control information "cmd" from the next-command-computing stage 604', wherein the control information comprises

- a plurality of data-read identifiers, labeled "cmd.data_addr", each indicative of an address of one of the data memories 606.8 under which data it to be read from,
- ALU-operand-selection information indicative of those operands from the operands received by the ALU, which are to be used by the ALU for the performance of the arithmetic-logical-processing operation, and
- ALU operation information indicative of an arithmetic-logical-processing operation to be performed.

The data memory 606.8 receives the plurality of data-read identifiers and is configured to retrieve data, labeled "data (rd)", from data-memory addresses indicated by the plurality of data-read identifiers and provide the data to an ALU-input selector 606.4, labeled "alu input select". The data comprised in the data memory 606.8 can be pre-configured using a bus interface labeled "bus interface".

The ALU-input selector 606.4 receives the data "data(rd)" as well as the payload data, labeled "t.data", from the stored token "t" as operands and the ALU-operand-selection information "cmd.alu_input_sel". Furthermore, the ALU-input selector 606.4 is configured to select those operands, which are indicated by the ALU-operand-selection information "cmd.alu_op_sel", and provide them to the ALU 606.2.

The ALU 606.2 receives the selected operands along with the ALU-operation information "cmd.alu_op_sel" and is configured to apply the arithmetic-logic operations indicated by the ALU-operation information "cmd.alu_op_sel" to the received operands. Furthermore, the ALU 606.2 is configured to provide a result of the ALU operation, labeled "alu_result", to the processing-control stage 608'. The ALU result comprises ALU-result data indicative of the result of the arithmetic-logical-processing operation and one or more ALU-result flags indicative of predefined arithmetic-logical status information associated with the ALU-result data. In the variant of the data-processing stage shown in the FIGS. 15-18, the value of the ALU-result flag is configured to indicate a negative result of the ALU operation, a result that is zero, a result that required a bit shift (carry), and an overflow. However, in other variants of the EPU 600' only a subset of the ALU-result flags or additional flags not mentioned here are used.

In certain circumstances it is also advantageous to manipulate addresses such as the data-read identifier or, if the EPU 600' is part of an EPU cluster, the EPU identifier by, for example, adding an offset to the address. Such address manipulations are possible with the data-processing stage 606'' shown in FIG. 16, which will be described in the following.

Figure 16:
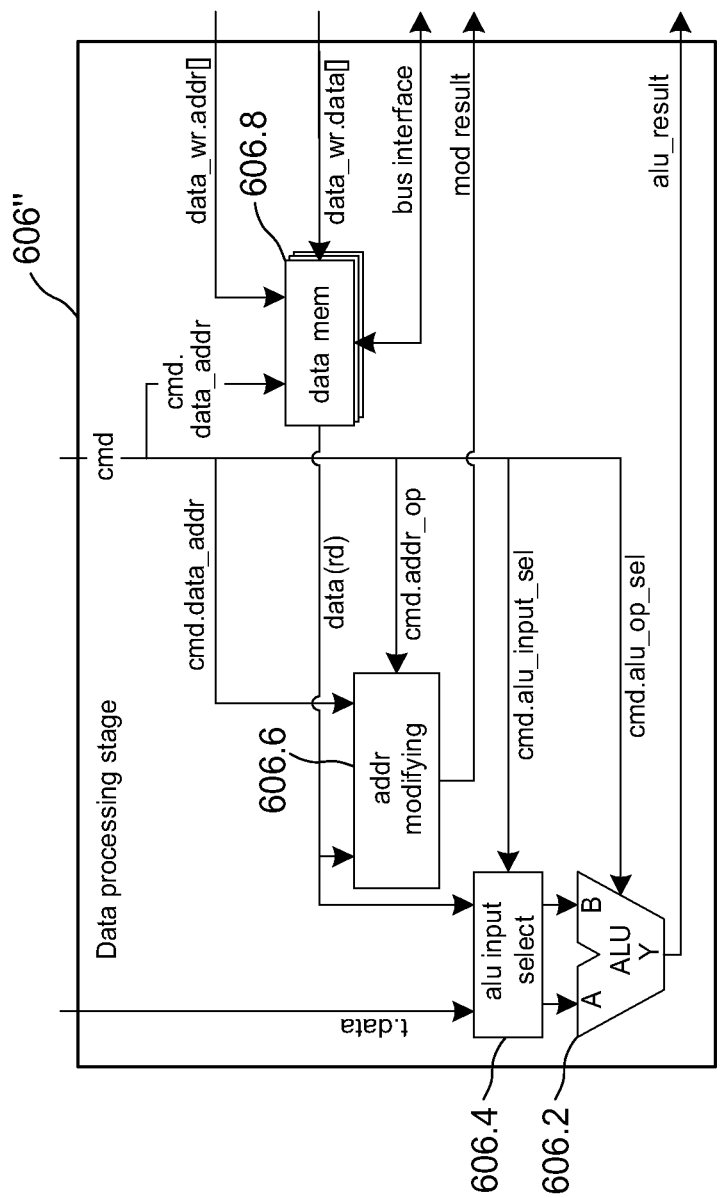
FIG. 16 is a block diagram of another variant of the data-processing stage of the EPU of FIG. 9 that comprises a data-memory-address-modifying unit in addition to an ALU and a data memory.

FIG. 16 shows a data-processing stage 606'' of the EPU 600 of FIG. 9 that comprises a data-memory-address-modifying unit 606.6 in addition to the ALU 606.2 and the data memory 606.8.

In addition to the data-read identifier "cmd.data_addr", the data memory 606.8 of the data-processing stage 606'' receives write data labeled "data_wr.data[ ]" to be written to the data memory 606.8 and a data-write identifier labeled "data_wr.addr[ ]" indicative of those addresses in the data memory 606.8 where the write data "data_wr.data[ ]" is to be written to.

Moreover, the control information "cmd" additionally comprises modification-operation information labeled "cmd.addr_op" indicative of a modification operation performed by the data-memory-address-modifying unit 606.8.

The data-memory-address-modifying unit 606.8 receives the modification-operation information, the data retrieved from the data memory 606.8, and the data-write identifier and is configured to modify the data-write identifier using the data and the modification operation indicated by the modification-operation information. The data-memory-address-modifying unit 606.8 provides a modified data-memory address, labeled "mod_result", as a result of the modification operation.

Figure 17:
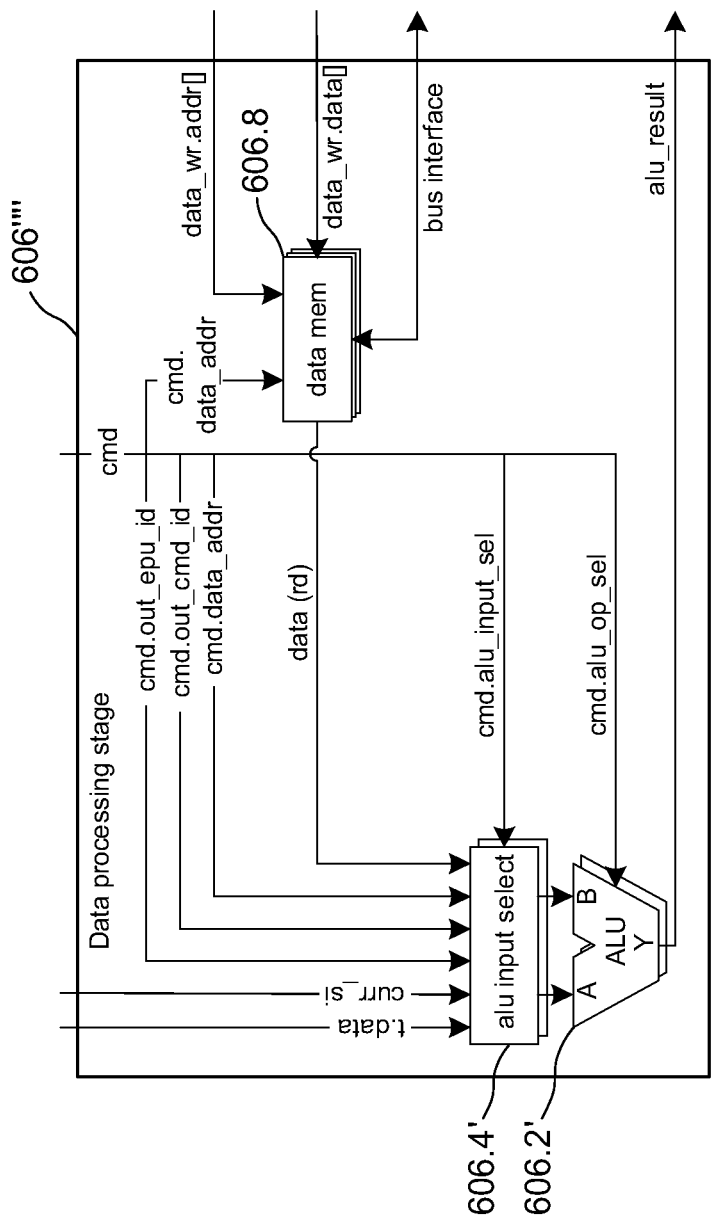
FIG. 17 is a block diagram of a further variant of the data-processing stage of the EPU of FIG. 9 that comprises an address-modifying unit that is configured to modify command identifiers, EPU identifiers and data-write identifiers.

FIG. 17 shows a data-processing stage 606''' of the EPU 600' of FIG. 9 that comprises an address-modifying unit 606.6 that is configured to modify command identifier, EPU identifier and data-write identifier.

The address-modifying unit 606.6' receives the command identifier, labeled "cmd.cmd_id", the EPU identifier, labeled "out_epu_id", the data-write identifier as operands, and the modification-operation information "cmd.addr_op" and is configured to perform the address-modification operations indicated by the modification-operation information on at least one of the operands, wherein the modifying-operation information also include operand-selection information and the address-modifying unit is configured to select the operands according to the operand-selection information.

In the data-processing stage 606''' shown in FIG. 17, the address-modifying unit 606.6' is a single unit. However, in other variants that are not shown here, the address-modifying unit 606.6' comprises a plurality of subunits, wherein the address-modifying operations on EPU identifier, command identifier, and data-read identifier are each performed in a different subunit.

Another difference between the data-processing stage 606'' of FIG. 16 and the data-processing stage 606''' of FIG. 17 is that the ALU-input selector 606.4 additional receives as an operand the current sequence indicator "curr_si". As a result, the data-processing stage 606''' is configured to use the current sequence indicator "curr_si" as an operand to perform arithmetical-logical operations on.

The variants of the data-processing stage 606'' shown in FIG. 16 and data-processing stage 606''' of FIG. 17 comprise two separate units, the address-modifying unit 606 and the ALU 606.2, for the modification of addresses and for performing arithmetic-logical operations, respectively. However, it is also possible to use an ALU to perform both address-modification operations and arithmetical-logical operations. A variant of the data-processing stage 606''' that comprises an ALU that includes an additional subunit for performing address-modifications operations is shown in FIG. 18.

Figure 18:
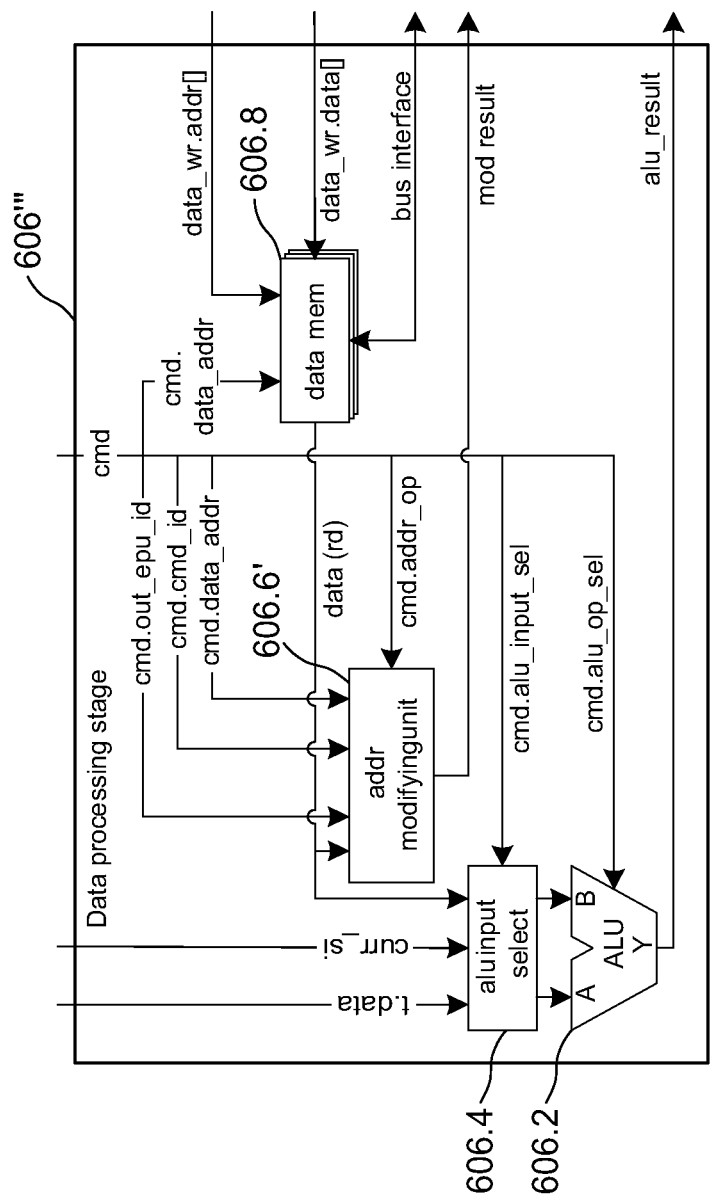
FIG. 18 is a block diagram of a further variant of the data-processing stage of the EPU of FIG. 9 that comprises an ALU that is additionally configured to perform address-modification operations.

FIG. 18 shows a data-processing stage 606'''' of the EPU 600' of FIG. 9 that comprises an ALU 606.2' that is additionally configured to perform address-modification operations.

The ALU 606.2' comprises two subunits that each receive two operands from an ALU-input selector 606.4'. Moreover, the ALU 606.2' receives the ALU-operation information "cmd.alu_op_sel" that indicate the operations to be performed on the operands of each subunit of the ALU 606.2'.

To provide two operands for each subunit of the ALU 606.2', the ALU-input selector 606.4' also comprises two subunits. Both subunits receive the payload data "t.data" of the stored token "t", the current sequence indicator "curr_si", the command identifier, labeled "cmd. cmd_id", the EPU identifier, labeled "out_epu_id", the data-write identifier as operands. Furthermore, the ALU-input selector 606.4' receives the operand-selection information "cmd.alu_input_sel" that now include information indicative of the selection of operands for each subunit of the ALU-input selector 606.4'.

In other variants of the data-processing stage 606', the ALU 606.2' comprises more than two subunits. In yet other variants of the data-processing stage 606', the ALU-input selector 606.4' comprises more than two subunits.

Figure 19:
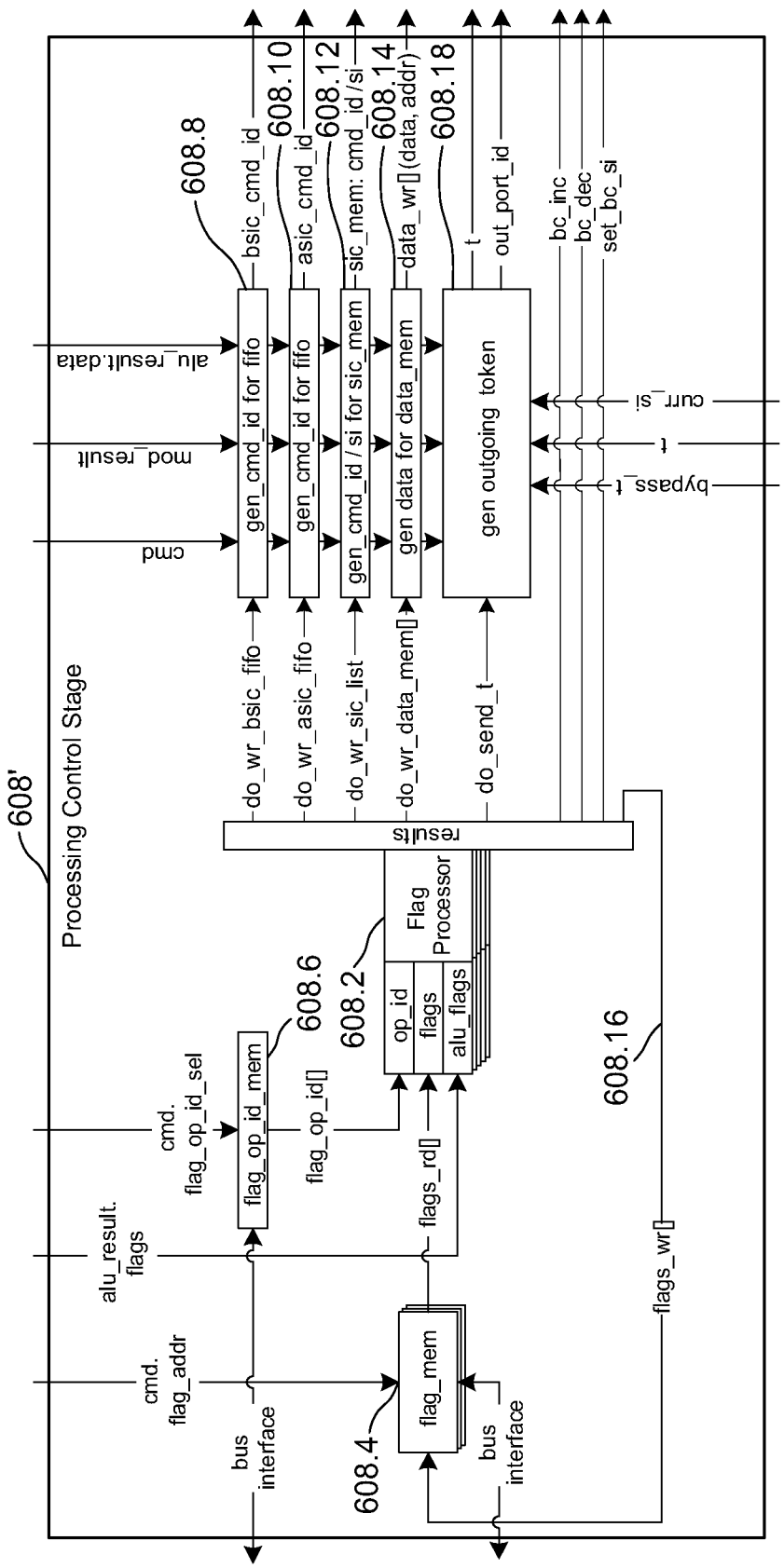
FIG. 19 is a block diagram of a variant of the processing-control stage that is used in the EPU of FIG. 9.

FIG. 19 shows a variant of the processing-control stage 608' that is used in the EPU 600' of FIG. 9.

The processing-control stage 608' controls the overall working of the EPU 600' by writing data into the different memories and FIFOs of the next-command-computing stage 604' and the data-processing stage 606', determining the setting of the blocking counter in the input stage 602', and controlling the output stage 610'.

In turn, the processing-control stage 608' receives the control information "cmd" and the current sequence indicator "curr_si" from the next-command-computing unit 604' as well as the ALU results "alu_result" and, if the data-processing stage 606' is configured to perform address modifications, the address-modification results "mod results" from the data-processing stage 606'. Moreover, if the EPU 600' is part of an EPU cluster, the processing-control stage 608' receives the stored token "t" and the signal "bypass_t" that indicates that the stored token "t" is to be forwarded to another EPU without modifications.

The central component in the processing-control stage 608' is an array of flag processors 608.2. The number of flag processors 608.2 is determined by the number of required control signals to control the operation of the EPU 600'. In the variant of the data-processing stage 608' shown in FIG. 19, 34 processors are used. In Tab. 4, the processors together with the respective control signal that each processor controls are given. The significance of the control signals will be explained later. In other variants of the processing-control stage 608', the number of control signals and therefore also the number of flag processor differs. In yet other variants of the processing-control stage 608', one processor controls a plurality of control signals.

TABLE 4

Overview of control signals controlled by the different processors.

| Flag Operation Id Index/ Processor | Control Signal |
|---|---|
| 0 | do_wr_bsic_fifo |
| 1 | do_wr_asic_fifo |
| 2 | do_wr_sic_list |
| 3-5 | do_wr_data_mem[0 . . . 2] |
| 6 | do_send_t |
| 7-9 | bc_inc, bc_dec, set_bc_si |
| 10-33 | flags_wr[0 . . . 23] |

The array of flag processors 608.2 receives three input signals: a list of flag operation identifiers labeled "flag_op_id[ ]", a list of state flags labeled "flags_rd[ ]", and the ALU-result flags "alu_result.flags".

The list of flag-operation identifiers "flag_op_id[ ]" is realized in a form of a vector, wherein each vector element addresses a different flag processor. Each vector element of the list of flag-operation identifiers "flag_op_id[ ]" indicates the logical operations that are to be performed by each flag processor of the array of flag processors 608.2. Moreover, each vector element of the list of flag-operation identifiers "flag_op_id[ ]" also indicates for each processor the operands that the flag operations are applied to. The list of flag-operation identifiers "flag_op_id[ ]" is retrieved from the flag-operations-identifier memory 608.6, labeled "flag_op_id_mem". The list of flag-operation identifiers "flag_op_id[ ]" that is forwarded to the array of flag processors 608.2 is chosen according to the control-information element "cmd.flag_op_id_sel". The flag-operation-identifier memory 608.6 can be configured externally via a bus interface. The operands that the flag operations indicated by the flag-operation identifier "flag_op_id[ ]" are applied to are chosen among the ALU-result flags "alu_result.flags" and the list of state flags "flags_rd[ ]".

The list of state flags "flags_rd[ ]" is created as a result of read operation performed on a flag memory 608.4, labeled "flag_mem". The content of the list of flags "flags_rd[ ]" is determined by the control-information element "cmd.flag_addr", also referred to as flag-read identifier. The flag-read identifier is indicative of the flag-memory address from which one or more state flags are to be read. The flag memory 608.4 can be configured externally via a bus interface.

While the operations of each flag processor are determined individually through a separate entry in the flag-operations identifier "flag_op_id[ ]", the ALU-result flags and the list of state flags may be used as operands by all flag processors of the array of flag processors 608.2. In the following, a detailed description of the operation of a single flag processor of the array of flag processors 608.2 will be given with reference to FIG. 20.

Figure 20:
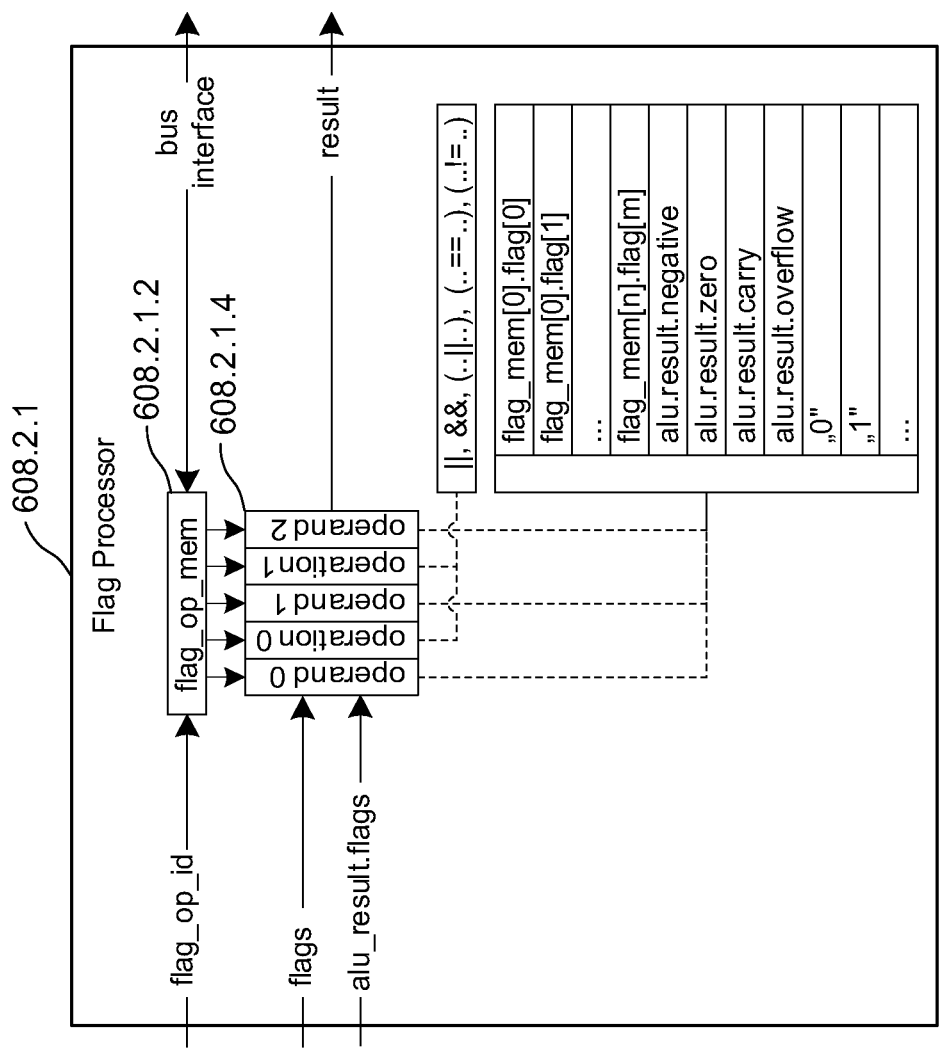
FIG. 20 is a block diagram of a single flag processor suitable for use in an array of flag processors.

FIG. 20 shows a block diagram of a single flag processor 608.2.1 of the array of flag processors 608.2.

The flag processor 608.2.1 comprises a flag-operation memory 608.2.1.2, labeled "flag_op_mem", and a binary logical unit (BLU) 608.2.1.4. The flag-operation memory 608.2.1.2 is configured to store for a predefined set of flag-operation identifier respective flag-operation information indicative of at least one flag operation and at least one operand that the flag operation is applied to. The flag-operation memory 608.2.1.2 can be configured through an external bus interface. The flag-operation information retrieved from the flag-operation memory 608.2.1.2 are used by the BLU 608.2.1.4 to select the operands from the ALU-result flags and the list of flags and perform the indicated flag operations. In the variant of the BLU 608.2.1.4 displayed in FIG. 20, the BLU is configured to perform operations comprising three operands that are concatenated by two operators. However, in other versions of the processing-control stage 608.2, the flag processor 608.2.1 is configured to perform flag operations using a different number of operands and operators.

The use of the flag-operations-identifier memory 608.6 and the flag-operation memory 608.2.1.2 is an optional optimization to reduce the width of the control information "cmd". In other variants of the EPU 600', the control information directly comprises the output of the flag-operation memory 608.2.1.2 for each processor. In yet other variants of the EPU 600', the control information directly comprises the list of flag-operations identifiers "flag_op_id [ ]" such that the flag-operations-identifier memory 608.6 is not required.

In another variant of the processing-control stage 608', the array of flag processors 608.2 is absent. Instead, the operations performed by the processors are hardwired into the logic structures, which could be FPGA, ASIC or ASSP, to reduce the use of resources.

Depending on the result of the flag operations performed by the array of flag processors 608.2, flag processors are configured to activate different signals. In Tab. 5, an overview of the signals used in the processing-control stage 608' of FIG. 20 and their purpose is given. In variants of the EPU 600', only a subset of these control signals is used. In other variants of the EPU 600', additional signals that are not listed in Tab. 5 are used.

TABLE 5

Overview of the possible control signals activated by the processors 608.2 and their functions.

| Signal | Description |
|---|---|
| do_wr_bsic_fifo | Performs writing operation to BSIC FIFO 604.2. |
| do_wr_asic_fifo | Performs writing operation to ASIC FIFO 604.3. |
| do_wr_sic_list | Performs writing operation to SIC memory 604.4. |
| do_wr_data_mem[ ] | Performs writing operation to the data memory 606.8 in the data-processing stage 606'. Signal includes an individual entry for each data memory if the data memory 606.8 comprises a plurality of memory units. |
| do_send_t | Forces the creation and output of an outgoing token. |
| bc_inc | Through the bc_inc, bc_dec, and set_bc_si |
| bc_dec | signals the processing-control stage 608' can |

TABLE 5-continued

Overview of the possible control signals activated by the processors 608.2 and their functions.

| Signal | Description |
| --- | --- |
| set_bc_si | increment, decrement, and set the sequence indicator of the blocking counter in the input stage 602'. |
| flags_wr[ ] | Vector of flags to be written back into the flag memory 608.4. |

If instructed by the result of the flag-processing operation, a write operation that writes the state flags labeled "flags_wr" to the flag memory 608.4 is performed. The flag-memory addresses under which the state flags "flags_wr" are written are those indicated by the flag-read identifier. In other variants of the processing-control stage 608, the control information comprises an additional control-information element referred to as flag-write indicator that indicates the flag-memory address under which the state flags "flags_wr" are to be written.

The write signals to BSIC FIFO 604.2, ASIC FIFO 604.3, and SIC memory 604.4 of the next-command-computing stage 604' are processed through a generator unit 608.8, labeled "gen_cmd_id for fifo"; a generator unit 608.10, labeled "gen_cmd_id for fifo", and a generator unit 608.12, labeled "gen_cmd_id/si for sic_mem", respectively. Possible sources for the command identifier, which will be written into the BSIC FIFO 604.2, the ASIC FIFO 604.3 or the SIC memory 604.4 are the ALU-result data "alu_result. data", the address-modification result "mod_result", and the control-information element "cmd.cmd_id[ ]". Which one is used is determined by the control-information element "cmd.bsic_sel", "cmd.asic_sel", and "cmd.sic_mem_sel", respectively. The source for the sequence indicator to be written into the SIC memory 604.4 is the ALU-result data "alu_result.data". The determined command identifier, and the associated sequence identifier in case of the SIC memory 604.4, is forwarded to the next-command-computing stage 604' via the signals labeled "bsic_cmd_id", "asic_cmd_id", and "sic_mem", respectively.

If the array of flag processors 608.2 activates the signal labeled "do_wr_data_mem", a write operation to the data memory 606.8 of the data-processing stage 606' is performed. The write operation is prepared in a generator unit 608.14 labeled "gen data for data_mem". The source of the data to be written into the data memory 606.8 is either the address-modification result "mod result" or the ALU-result data "alu_result.data". Which source is used, is determined by the control-information element "cmd.data_wr_sel[ ]". If the data memory 606.8 comprises a plurality of memory units, the control-information element "cmd.data_wr_sel[ ]" comprises an entry for each memory unit. Similarly, also the output, labeled "data_wr[ ]", of the write unit 608.14 comprises an entry for each memory unit of the data memory 606.8.

If the signal "do_send_t" is activated, a new token is prepared to be output by a generator unit 608.18, labeled "gen outgoing token". In the EPU 600' shown here, the token identifier is identical to the value of the associate command identifier. In the processing-control stage 608', the token identifier to be used for the outgoing token may therefore be set to one of the entries of the control-information element "cmd.cmd_id[ ]", the address-modification result "mod_result", or the ALU-result data "alu_result. data". The selection of the source for token identifier of the outgoing token is determined by control-information element "cmd.out_identifier_sel". The sequence indicator of the outgoing token is set to the value of the current sequence indicator "curr_si", which is also an input to the generator unit 608.18. The EPU identifier of the outgoing token is set to the value of the control-information element "cmd. out_ epu_id". The created outgoing token together with the control-information element "cmd.out_port_id" are forwarded to the output stage 610', wherein value of the control-information element "cmd.out_port_id" determines the output port of the output stage 610' through which the token will be output.

In case that the signal "bypass_t" is activated, the stored token "t" is forwarded without any modifications to a given output port of the output stage 610', wherein the input port though which the token was received determines the output port.

Figure 21:
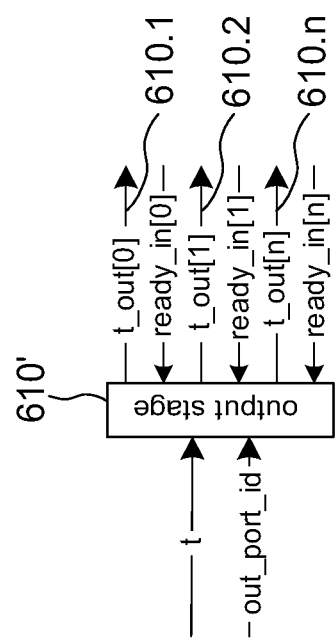
FIG. 21 is a block diagram of an output stage suitable for use in the EPU of FIG. 9.

FIG. 21 shows a block diagram of the output stage 610' suitable for use in the EPU 600' of FIG. 9.

The output stage 610' is configured to forward tokens that were addressed to a different EPU or output tokens that were created as part of the processing of a command identifier. To this end, the output stage 610' receives the composed token "t" and the output port identifier "out_port_id" from the processing-control stage 608'.

The output stage 610' displayed in FIG. 21 comprises three output channels 610.1, 610.2, and 610.n. For each of these output ports, a handshaking mechanism may be implemented. This is visualized through the ready_in[0], ready_in [1], and ready_in[n] signals for each output port. The numbering of the output channels from 1-n indicates that other variants of the output stage 610' of the EPU 600' comprise a different number of output channels that is smaller or larger than 3.

Moreover, in variants of the EPU 600', the EPU comprises a direct connection between the next-command-identifier-computing unit and the output channels. In this variant, the next-command-identifier-computing unit is configured to stop any processing operation, if the ready_in[0], ready_in [1], or ready_in[n] signal indicates that outputting a token is not possible at that moment. As was already explained, through the output ports of the output stage 610' the EPU 600' can be connected to other EPUs as is the case, for example, for the EPC 132. Moreover, the output ports of the output stage 610' can be connected to an input port of a computer as a means to analyze results of the token processing performed by the EPU 600. Another means to analyze the results of the token processing is to connect a computer through the bus interface to directly read out the memories contained in the different stages comprised in the EPU 600'.

In the follow, the operation of the EPU 600' will be explained using an example application, where the EPU 600' is used to check a particular type of constraint in the setup shown in FIG. 1.

A common task that is performed when a trace-data stream is analyzed is to check if one instruction A (event A) was executed before another instruction B (event B), or in other words: Check if B is only executed after A was executed. A may be, for example, an instruction comprised in the program executed by the DUT 102 and corresponds to an instruction address 1000. B may similarly be an instruction in the program executed by the DUT 102 and corresponds to an instruction address 2000.

The CFRU 122 generates a token with a token identifier of 1 (t_id=1) when the CFRU 122 infers from the incoming trace-data stream that the instruction at the instruction address 1000 was executed by the DUT 102 and generates another token with a token identifier of 2 (t_id=2), when the CFRU 122 infers from the incoming trace-data stream that the instruction at instruction address 2000 has been executed. The BMFSU 118 receives the tokens and forwards them, together with any other tokens, to the EPC 132, which includes in the example present here only a single EPU.

Initially a value stored at data-memory address "0" of a memory unit "mem1" of the data memory 606.8 is set to 1, i.e. "mem1[0]=1". Moreover, the EPU is configured to execute two operations:

If a token with "t_id=1" is received (A occurred), the value mem1[0] of the data memory 606.8 is set to "0".

If a token with "t_id=2" is received (B occurred), the value of mem1[0] is checked. If "mem1[0]==0", nothing happens (A occurred before B). If "mem1[0]==1" (B occurred without a previous occurrence of A), a token is generated, which indicates a violation of the constraint "Check, if B is only executed after A was executed".

In an alternative approach, the EPU is configured to write a value to another memory location that indicates the violation of the constraint rather than generating a token, e.g. set "mem1[1]=1". The value of mem1[1] is then checked externally through the bus interface of the data memory 606.8.

In the following, a more detailed description of the processes occurring inside the EPU 600' when a token with "t_id=1" or "t_id=2" is received, is given.

Tab. 6 describes the initial configuration of the three memory units comprised in the data memory 606.8 of the data-processing stage 606'. Here and in the following, addresses are always given in hexadecimal numbers and data values in decimal numbers. Cells containing an "x" indicate a value that is irrelevant for the processing scheme of this example. The relevant cells for this example are the cell with the address "0x0" in the memory unit "mem0" and the cell with the address "0x0" in the memory unit "mem1", which are initially set to "0" and "1", respectively.

TABLE 6

| Memory unit "mem0" | | Memory unit "mem1" | | Memory unit "mem2" | |
|---|---|---|---|---|---|
| Address | Data | Address | Data | Address | Data |
| 0x0 | 0 | 0x0 | 1 | 0x0 | x |

Event A leads to the generation of a token with the token identifier "t_id=1" according to the mapping described above. The control information associated to the token identifier "t_id=1" is fetched from the command memory 604.6 of the next-command-computing stage 604' and is from there forwarded to the data-processing stage 606' and the processing-control stage 608. The relevant elements of the control information for the current example are given in Tab. 7.

TABLE 7

Selected elements of the control information corresponding to the token identifier "t_id = 1" and "t_id = 2"

| | Token Identifier | |
|---|---|---|
| Elements | "1" | "2" |
| data_addr[0] | 0x0 | x |
| data_addr[1] | x | 0x0 |
| flag_op_id_sel | 0x0 | 0x1 |
| data_wr_sel[1] | 1 | x |
| alu input sel[A] | mem0 | mem1 |
| alu op sel | PAS | PAS |
| cmd idr[0] | x | 0x3 |
| out cmd id sel | x | 0x1 |
| out port id | x | 0 |
| out epu id | x | 0x1 |

In the data-processing stage 606', the control-information element "data_addr[ ]" leads to the retrieval of data stored in the data memory 606.8. The value "0x0" of element "data_addr[0]" indicates that the value of the cell with the data-memory address "0x0" from the memory unit "mem0" is retrieved. The information is forwarded to the ALU-input selector 606.4. The value "mem0" of the control-information element "alu_input_sel[A]" indicates that the data retrieved from the data memory 606.8 is used as one of the operands by the ALU 606.2. The value "PAS" of the control-information element "alu_op_sel" determines that the memory content of the memory unit "mem0" is simply forwarded to the output port of the ALU without any manipulations.

In the processing-control stage 608', the entry "0x0" of the control-information element "flag_op_i_sel" leads to the fetching of the "flag_op_id[ ]" vector from the flag-operation-identifier-memory address "0x0" in the flag-operation-identifier memory 608.6. The content of the flag-operation-identifier memory 608.6 is given in Tab. 8. For brevity, Tab. 8 only shows the first seven elements of the "flag_op_id[ ]" vector. The remaining elements are zero. The number of elements of the "flag_op_id[ ]" vector corresponds to the number of flag processors. The "flag_op_id[ ]" determines the operators and operands of the equation which is evaluated by each of the flag processors comprised in the array of flag processors 608.2. A simplified list of equations corresponding to the entries of the "flag_op_id[ ]" vector are given in Tab. 9. All entries of Tab. 9 that are set to "0x0" correspond to an equation that is always evaluated as false. Therefore, no control signals are set. The only entry that is non-zero is an element 4 of the "flag_op_id[ ]" vector. The corresponding flag processor 4 is responsible for setting the control signal "do_wr_data_mem[1]". Since the entry "0x1" corresponds to an equation which always evaluates to true, a writing operation to memory unit "mem1" of the data memory 606.8 is performed. The data source for the writing operation to memory unit "mem1" is the result of the ALU calculation as determined by the value of the control-information element "data_wr_sel[1]". As a result, a value "0" is written to the cell with the memory address "0x0" of memory unit "mem1", indicating that the event A has occurred.

TABLE 8

| Address | flag_op_id[0] | flag_op_id[1] | flag_op_id[2] | flag_op_id[3] | flag_op_id[4] | flag_op_id[5] | flag_op_id[6] | ... |
|---|---|---|---|---|---|---|---|---|
| 0x0 | 0x0 | 0x0 | 0x0 | 0x0 | 0x1 | 0x0 | 0x0 | 0x0 |
| 0x1 | 0x0 | 0x0 | 0x0 | 0x0 | 0x0 | 0x0 | 0x2 | 0x0 |

TABLE 9

| Address | Equation |
|---|---|
| 0x0 | Always false |
| 0x1 | Always true |
| 0x2 | NOT alu.result.zero |

If a token that was created in response to the occurrence of the event B is received, the corresponding control information is retrieved from the command memory 604.6 and forwarded to the data-processing stage 606' and the processing-control stage 608'. The control information instructs the data-processing stage 606' to retrieve the cell with the address "0x0" of memory unit "mem1" from the data memory 606.8 and forward it to the ALU. The ALU forwards this value to the processing-control stage 608 without any manipulation. The result "alu.result" of the ALU calculation is used as an input value for the array of flag processors 608.2. The "flag_op_id[ ]" vector corresponding to address "0x1" is loaded from the flag-operation-identifier memory 608.6. The only non-zero element of the vector is the element 1 with the value "0x2". The equation corresponding to "0x2" checks if the result of the ALU operation is not zero. If the event A occurred before the event B, "mem1[0]" is "0". Therefore, the equation evaluates to false and no further actions are taken. If the event B occurred before the event A, the "mem1[0]" is "1" and the equation evaluates to true. As a result, the do_send_tcontrol signal is set. In that case, an outgoing token is generated, indicating the error. The token is addressed to EPU "0x1" (out_epu_id: 0x1) and output through output port "0" (out_port_id: 0). The according token identifier "0x3" is read as an immediate value from the list of command identifiers (cmd_id[0]: 0x3), since the value of the control-information element "out_cmd_id_sel" is set to "0x1".

After the EPU 600 and EPU 600' have been described, the following section will focus on the description of clusters of event processing units.

Through the routing of tokens and the individual configurations of the EPUs included in a cluster of EPUs, complex processing schemes for event messages can be realized. In the following, two examples of clusters of EPUs will be described.

Figure 22:
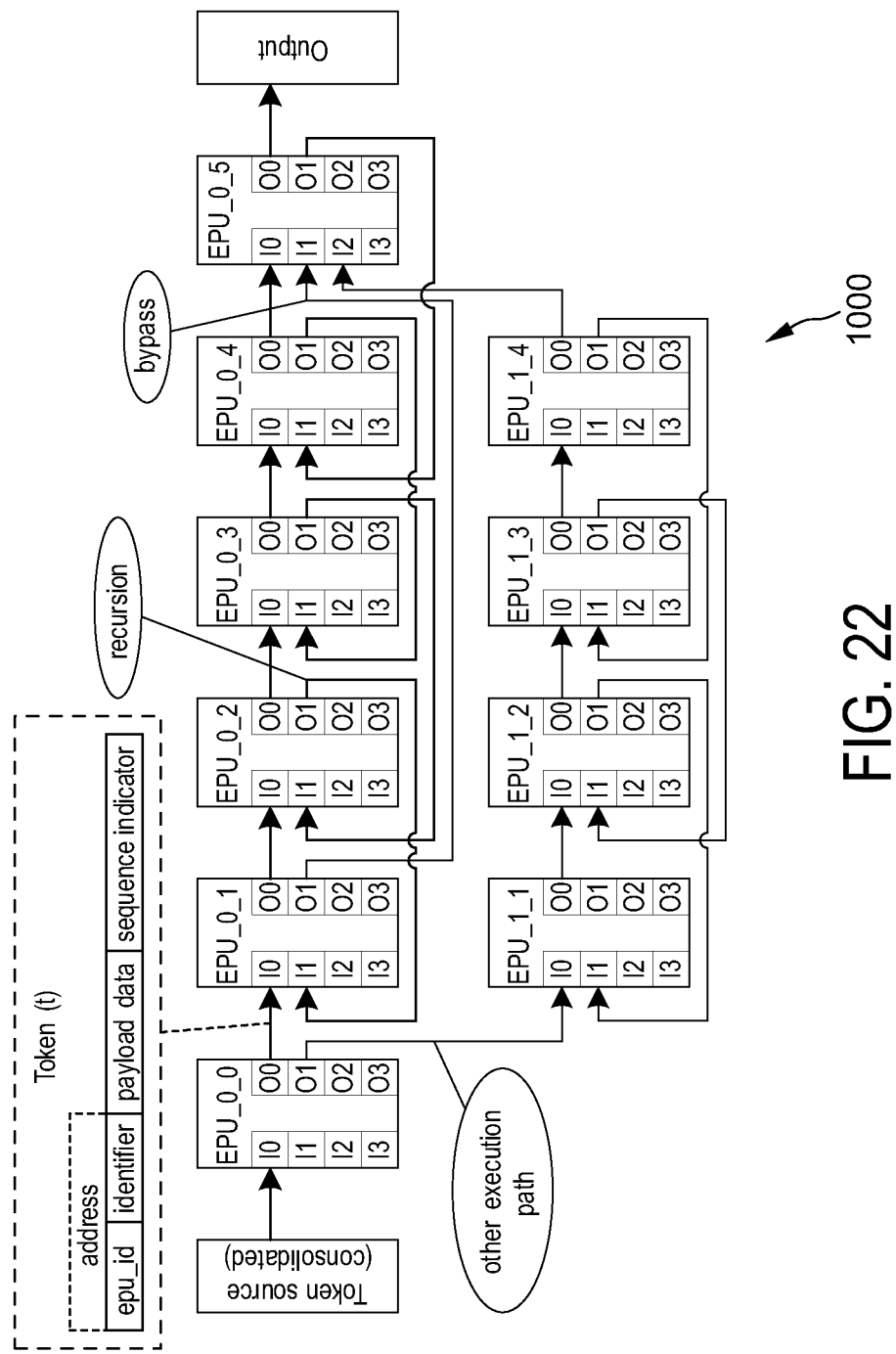
FIG. 22 is an illustration of a cluster of EPUs, hereinafter also referred to as EPC.

FIG. 22 shows ten EPUs forming a cluster of EPUs, hereinafter also referred to as EPC 1000. The EPUs are labeled "EPU_0_0" to "EPU_0_5" and "EPU_1_1" to "EPU_1_4". Each EPU possesses four input ports labeled "I0" to "I3" and four output ports labeled "O0" to "O3". The arrows between input and output ports visualize the connections between the EPUs. The EPC 1000 of FIG. 22 only serves to illustrate some key features that can be found in most clusters of EPUs. Other clusters of EPUs comprise a number of EPUs different from the number of EPUs comprised in EPC 1000. Moreover, the number of input and output ports of the EPUs comprised in other cluster of EPUs is different from the ones shown in FIG. 22.

An EPU processes a token, if the token is addressed to this EPU indicated by the "epu_id" attribute of the token. If the token reaches an EPU that it is not addressed to, it is forwarded without modification to the output port of the EPU with the same number as the input that the token entered through. When the token reaches the EPU that it is addressed to the EPU removes the token from the token stream. However, in some configurations, as a result of the processing of the token, the EPU generates one or more new tokens that are forwarded to other EPUs.

In FIG. 22, a stream of event messages is received by the cluster from an event source, e.g. the BMFSU 118 of FIG. 1 and FIG. 3, through the input port "I0" of EPU "EPU_0_0". From there the stream of tokens is split in an upper and a lower execution path. This cluster structure is particularly advantageous, if two classes of tokens are to be processed that require fundamentally different processing steps. The upper execution path includes the EPUs labeled "EPU_0_1", "EPU_0_2", "EPU_0_3", and "EPU_0_4", while the lower execution path includes the EPUs labeled "EPU_1_1", "EPU_1_2", "EPU_1_3", "EPU_1_4". The EPUs of both execution paths are arranged in two separate rows. The EPUs of each path are linked to each other in a linear chain realized by a connection between the output port "O0" of one EPU with the input port "I0" of its neighboring EPU on the right. Through these connections, the tokens propagate in a linear manner from the left to the right within the upper and lower execution path. For certain processing requirements, it is also desirable to allow tokens to propagate in the opposite direction. Such a backward propagation can be used to realize recursive operations. In the cluster shown in FIG. 15, recursions are realized by connecting the output port "O1" of one EPU to the input port "I1" of its neighboring EPU to the left. Another typical feature of clusters of EPUs is the so-called bypass. Bypasses allow tokens to skip certain processing steps by being forwarded to an EPU that lies beyond the neighboring EPU on the right. In FIG. 22, such a bypass is used to connect EPU "EPU_0_1" directly with EPU "EPU_0_5" by connecting the output port "O1" of EPU "EPU_0_1" with the input port "I1" of EPU "EPU_0_5".

The upper and lower execution paths shown in FIG. 22 are merged together again by connecting the output port "O0" of the EPU "EPU_0_4" to the input port "I0" of the EPU "EPU_0_5" and the output port "O0" of the EPU "EPU_1_4" to the input port "I2" of the EPU "EPU_0_5". The final results of the processing are output through output port "O0" of the EPU "EPU_0_5". Alternatively, an event message can propagate in the opposite direction through a recursion from EPU "EPU_0_5" to EPU "EPU_0_4".

Figure 23:
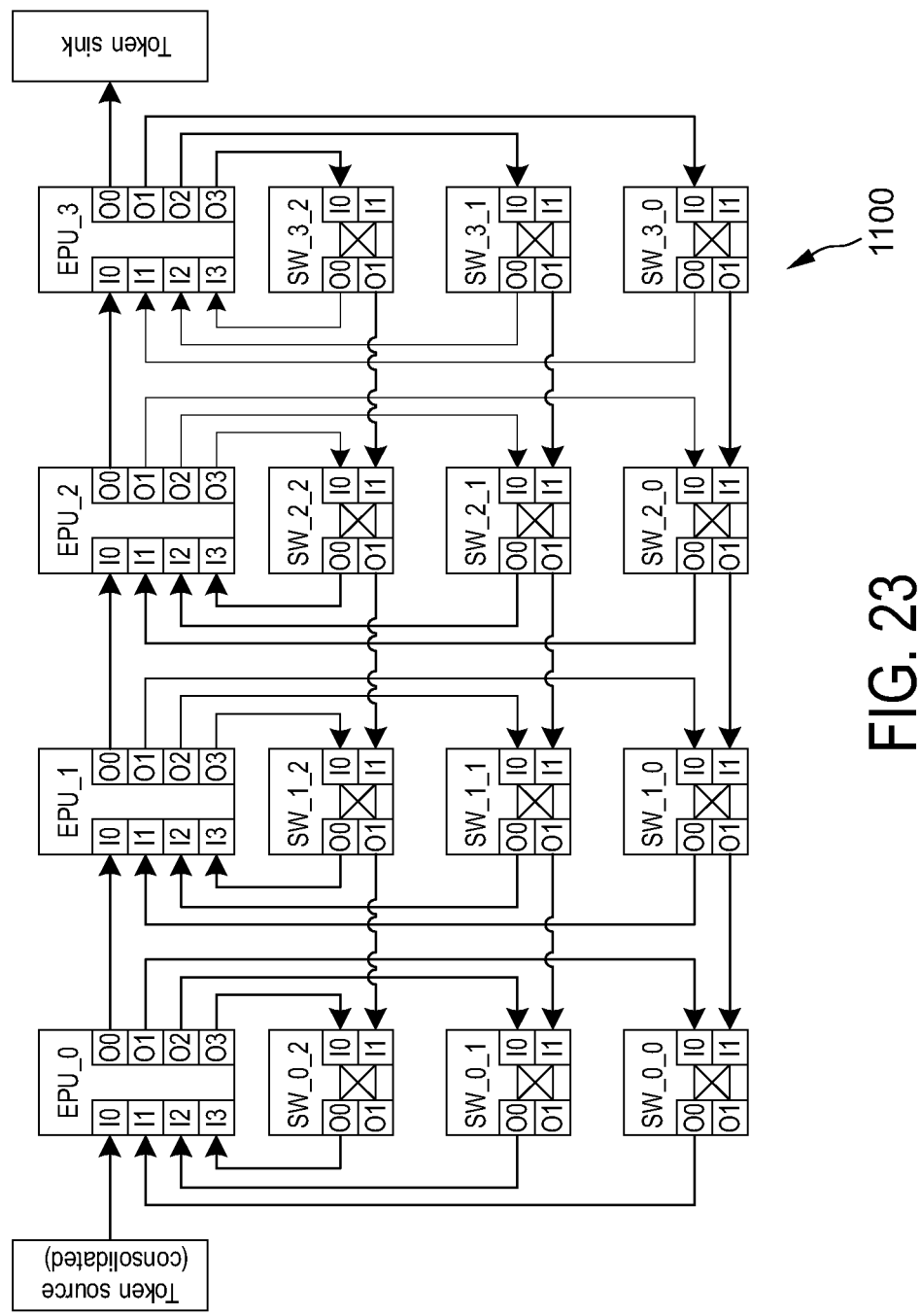
FIG. 23 is an embodiment of an EPC comprising four EPUs with three associated switches each.

The connections between the EPUs shown in FIG. 22 are static. However, a static connection between the EPUs considerably limits the processing capabilities of tokens. In FIG. 23, another embodiment of a cluster is shown that allows to change the cluster configuration.

FIG. 23 shows an EPC 1100 comprising four EPUs with three associated switches each. The EPUs are labeled "EPU_0" to "EPU_3" with each four input ports labeled "I0" to "I3" and output ports labeled "O0" to "O3".

The EPUs are connected through their input ports "I0" and their output ports "O0" in a linear chain. An event source, e.g. the BMFSU 118 of FIG. 1 and FIG. 3, is connected to input port "I0" of the EPU "EPU_0". The output port "O0" of the EPU "EPU_3" is connected to an event sink. Furthermore, FIG. 23 shows three switches for each EPU, which are positioned in three rows underneath each EPU. In the following, the three switches for each EPU will be references to as first, second, and third switch. The EPUs are connected to their associated switches in the following way:

The output port "O1" of the EPU is connected with the input port "I0" of the first switch. The output port "O2" of the EPU is connected with the input port "I0" of the second switch. The output port "O3" of the EPU is connected with the input port "I0" of the third switch.

Furthermore, the output port "O0" of the first switch is connected to the input port "I1" of the EPU. The output port "O0" of the second switch is connected to the input port "I2" of the EPU. The output port "O0" of the third switch is connected to the input port "I3" of the EPU.

Furthermore, for the switches of one EPU are connected to the switches of its neighboring EPU on left in the following way:

The output port "O1" of the first switch is connected to the input port "I1" of the first switch of the neighboring EPU to the left. The output port "O1" of the second switch is connected to the input port "I1" of the second switch of the neighboring EPU to the left. The output port "O1" of the third switch is connected to the input port "I1" of the third switch of the neighboring EPU to the left.

If an EPU has no neighboring EPU on the left, e.g. EPU "EPU_0", then the output ports "O1" of its respective switches are unconnected. Moreover, if an EPU has no neighboring EPU on the right, e.g. EPU "EPU_3", then the input ports "I1" of its respective switches are unconnected as well.

The advantage of using switches in a cluster of EPUs is that the connection between the input ports "I0" and "I1" and the output ports "O0" and "O1" of a switch is programmable. For the example in FIG. 23, this means that available recursions between any two EPUs can be adjusted depending on the processing requirements.

To prevent an overflow of the input ports of the EPUs comprised in the cluster, it is also possible to implement a handshaking mechanism.

Figure 24:
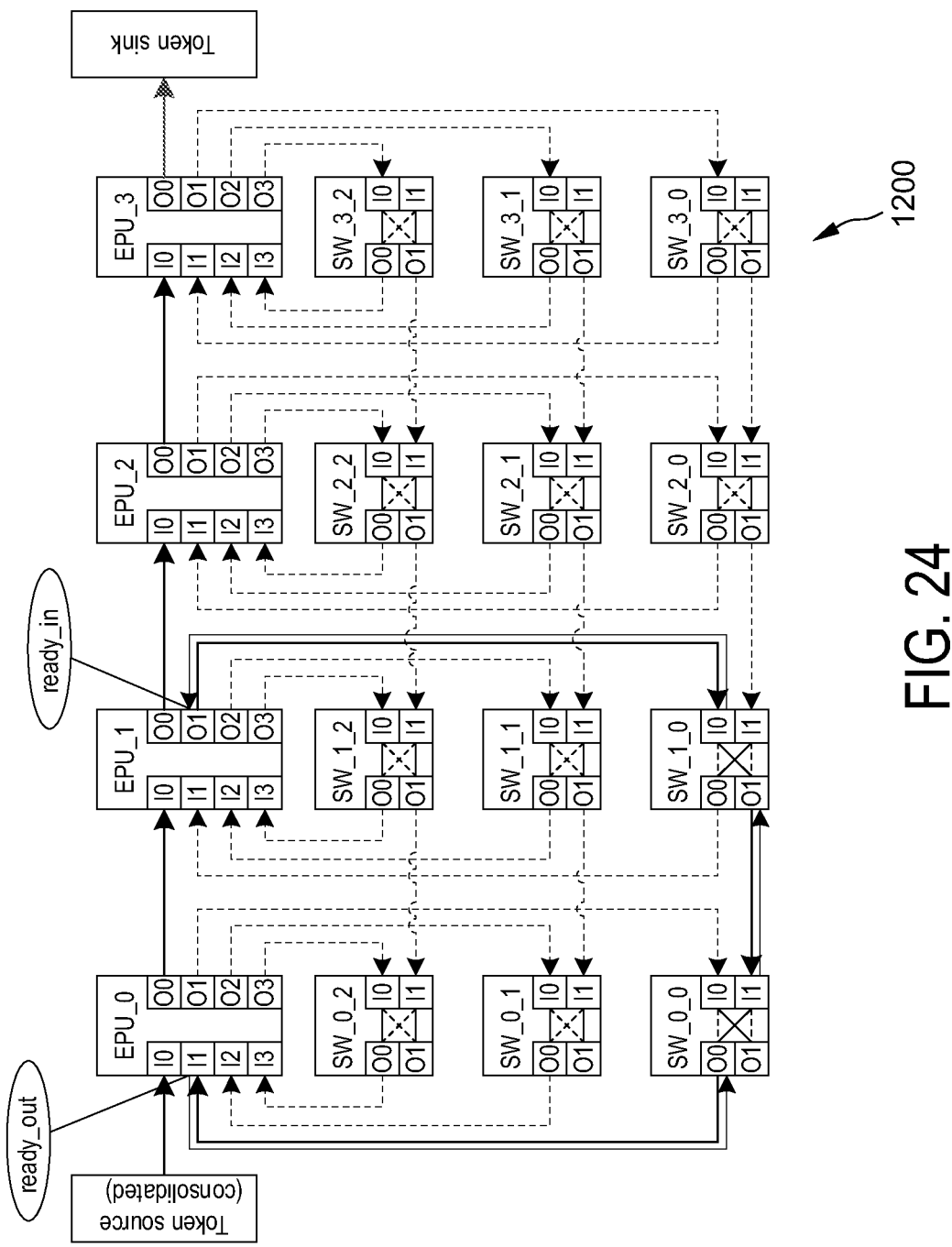
FIG. 24 shows a further embodiment of an EPC.

FIG. 24 shows an example of a handshaking mechanism for a recursion comprised in the EPC 1100 of FIG. 23. The EPU "EPU_0" and the EPU "EPU_1" are connected with each other through the switches "SW 1_0" and "SW 0_0". The two switches are programmed to relay the "ready_out" signal from input port "I1" of the EPU "EPU_0" to the output port "O1" of the EPU "EPU_1". In the process, the "ready_out" signal follows the recursion between the two EPUs in the opposite direction.

In summary, the invention relates to a trace-data-processing device for reconstructing an execution flow of a program performed by a source device under test or under observation, herein DUT, using at least one source-specific trace-data stream. The trace-data-processing device comprises a trace-data-processing unit, which is configured to identify in the trace-data stream at least one instruction-synchronization message and branch messages. Moreover, the trace-data-processing device is configured to generate runtime-information data indicative of an at least partial reconstruction of the execution flow, using the identified trace messages, a pre-defined branch identifier allocated to each branch instruction address in the program that is associated with a direct branch instruction and pre-stored reconstruction information stored in a reconstruction memory.

The project leading to this application has received funding from the European Union's Horizon 2020 research and innovation programme under grant agreement No. 732016.

The invention claimed is:

1. An event-processing unit for processing tokens associated with a state or state transition, herein also referred to as an event, of an external device, the event processing unit comprising:
an input stage for receiving at least one incoming token, the incoming token carrying a token identifier indicative of one event from a predetermined set of events, and payload data;
a next-command-computing stage that receives the incoming token from the input stage and comprises
a command memory that allocates to a predetermined set of token identifiers a set of command identifiers and that comprises command-set data that allocates to the set of command identifiers control information comprising at least
ALU-operation information indicative of an arithmetic-logical-processing operation to be performed, and
a data-read identifier indicative of a data-memory address to read from in a data memory or a data-write identifier indicative of a data-memory address to write to in the data memory, and
flag-operation information indicative of a flag-processing operation to be performed; wherein
the command memory is configured to provide the control information associated with the token identifier of the incoming token;
a processing stage for receiving and processing the control information and the incoming token and that comprises a data-processing stage and a processing-control stage; wherein
the data-processing stage comprises
(i) the data memory, which is configured to provide data, which is stored under the data-memory address indicated by the data-read identifier, upon reception of the data-read identifier;
(ii) an arithmetic-logic unit, referred to as ALU, that receives the data provided by the data memory, the payload data of the incoming token, and the ALU-operation information, and that is configured to perform the arithmetic-logical-processing operation indicated by the ALU-operation information using the data or the payload data as operands and to provide ALU-result data indicative of a result of the arithmetic-logical-processing operation, and to provide one or more ALU-result flags indicative of predefined arithmetic-logical status information associated with the ALU-result data, and wherein
the processing-control stage receives the flag-operation information, the ALU-result data, and the ALU-result flag, and is configured to perform the flag-processing operation indicated by the flag-operation information using the ALU-result flag, and, if instructed by a result of the flag-processing operation, write the ALU-result data to the data memory under the data-memory address indicated by the data-write identifier.

2. The event-processing unit of claim 1, wherein
the control information additionally comprises an outgoing token identifier for use in generating an outgoing token;
the processing-control stage is configured, if instructed by the result of the flag-processing operation, to generate and provide the outgoing token, using the outgoing token identifier as the token identifier and the ALU-result data as the payload data of the outgoing token; and wherein the event-processing unit comprises an output stage that is configured to output the outgoing token.

3. The event-processing unit of claim 1, wherein
the processing-control stage comprises a programmable flag memory, which is configured to store one or more state flags indicative of a current state of one or more predefined conditions,
the control information additionally comprises a flag-read identifier indicative of a flag-memory address to read from in the flag memory or a flag-write identifier indicative of a flag-memory address to write to in the flag memory; wherein
the flag memory is configured, upon receiving a flag-read identifier, to provide that state flag which is associated with the flag-memory address; and wherein
the processing-control stage is configured to perform, additionally using the state flag provided by the flag memory, the flag-processing operation indicated by the flag-operation information, and to write the result of the flag-processing operation into the flag memory at the flag-memory address indicated by the flag-write identifier.

4. The event-processing unit of claim 1, wherein
the data-processing stage comprises an identifier-modifying unit that receives the data-write identifier included in the control information and the data provided by the data memory upon reception of the data-read identifier, and that is configured to perform a modification of the data-write identifier using the data-write identifier and the data, and to provide a modified data-write identifier indicative of a result of the modification; and
the processing-control stage receives the modified data-write identifier and is configured to, depending on the result of the flag-processing operation, write the ALU-result data to the data memory at the data-memory-address indicated by the modified data-write identifier.

5. The event-processing unit of claim 1, wherein
the ALU is configured to receive and extract a plurality of operands of the incoming token;
the control information stored in the command memory and provided by the next-command-computing stage additionally includes an ALU-operand-selection information indicative of those operands from the operands received by the ALU, which are to be selected by the ALU for its performance of the arithmetic-logical-processing operation indicated by the ALU-operation information; and
wherein the ALU receives the ALU-operand-selection information and is configured to perform the arithmetic-logical-processing operation indicated by the ALU-operation information on those operands indicated by the ALU-operand-selection information.

6. The event-processing unit of claim 1, wherein
the next-command-computing stage is configured to receive and extract from the at least one incoming token a sequence indicator that specifies a point in time associated with a generation of the incoming token relative to a reference point in time;
the next-command-computing stage comprises a token register for temporarily storing the incoming token;
the next-command-computing stage further comprises a current-sequence-indicator register for storing a current sequence indicator, which is the sequence indicator associated to the command identifier last provided to the command memory;
the next-command-computing stage comprises a before-sequence-indicator-change memory, herein BSIC memory, for storing command identifiers which point to that control information which is to be processed before the current sequence indicator stored in the current sequence indicator register is changed;
the control information additionally comprises a second command identifier, and BSIC-write-selection information indicative of whether either the second command identifier or the ALU-result data is to be selected as a BSIC-memory input;
the processing-control stage comprises a BSIC-write controller, which is configured to receive the B SIC-write-selection information, to select the B SIC-memory input indicated therein, and, depending on the result of the flag-processing operation, to write the selected BSIC-memory input to the BSIC memory; wherein the next-command-computing stage comprises a next-command-identifier-computing unit that receives the token identifier of the incoming token and is configured
upon determining that the sequence indicator of the incoming token differs from the current sequence indicator stored in the current sequence indicator register, before forwarding the respective command identifier allocated to the token identifier of the incoming token to the command memory,
 (i) to forward to the command memory any second command identifiers stored in the BSIC memory, for processing of the associated control information by the processing stage, and to subsequently remove the forwarded second command identifiers from the BSIC memory,
 (ii) to subsequently set the current sequence indicator in the current-sequence-indicator register to the sequence indicator of the incoming token; and
to forward the respective command identifier allocated to the token identifier of the incoming token to the command memory.

7. The event-processing unit of claim 1, wherein
the next-command-computing stage is configured to receive and extract from the at least one incoming token a sequence indicator that specifies a point in time associated with a generation of the incoming token relative to a reference point in time;
the next-command-computing stage comprises a token register for temporarily storing the incoming token;
the next-command-computing stage further comprises a current-sequence-indicator register for storing a current sequence indicator, which is the sequence indicator associated to the command identifier last provided to the command memory;
the next-command-computing stage comprises an after-sequence-indicator-change memory, herein ASIC memory, for storing command identifiers which are indicative of that control information which is to be processed after the current sequence indicator stored in the current-sequence-indicator register has been changed to the sequence indicator of the incoming token;
the control information additionally comprises a second command identifier, and ASIC-write-selection information indicative of whether either the second command identifier or the ALU-result data is to be selected as an ASIC-memory input;
the processing-control stage comprises an ASIC write controller, which is configured to receive the ASIC-write-selection information, to select the ASIC-memory input indicated therein, and, depending on a result of the flag-processing operation, to write the selected ASIC-memory input to the ASIC memory;

the next-command-computing stage comprises a next-command-identifier-computing unit configured to forward a command identifier and wherein, the next-command-identifier-computing unit is additionally configured upon determining that the sequence indicator of the incoming token differs from the current sequence indicator stored in the current-sequence-indicator register, before forwarding the respective command identifier allocated to the token identifier of the incoming token to the command memory, (i) to set the current sequence indicator in the current sequence indicator register to the sequence indicator of the incoming token, (ii) to forward to the command memory any second command identifiers stored in the ASIC memory, for processing of the associated control information by the processing stage, and to subsequently remove the forwarded second command identifiers from the ASIC memory and to subsequently forward the respective command identifier allocated to the token identifier of the incoming token to the command memory.

8. The event-processing unit of claim 1, wherein the next-command-computing stage is configured to receive and extract from the at least one incoming token a sequence indicator that specifies a point in time associated with a generation of the incoming token relative to a reference point in time;

the next-command-computing stage comprises a token register for temporarily storing the incoming token;

the next-command-computing stage further comprises a current-sequence-indicator register for storing a current sequence indicator, which is the sequence indicator associated to the command identifier last provided to the command memory;

the next-command-computing stage comprises a sequence-indicator-change memory, herein SIC memory, for storing command identifiers and associated sequence indicators, wherein the stored command identifiers are indicative of that control information which is to be processed when the sequence indicator of the incoming token is equal to or larger than the value of the sequence indicator of the respective associated command identifier stored in the SIC memory;

the control information additionally comprises a second command identifier;

the processing-control stage comprises a SIC write controller, which is configured, if instructed by the result of the flag-processing operation, to generate as the ALU result data and write to the SIC memory the generated sequence indicator in association with the second command identifier; and wherein the next-command-computing unit is additionally configured upon determining that the sequence indicator of the incoming token differs from the current sequence indicator stored in the current-sequence-indicator register, before forwarding the respective command identifier allocated to the token identifier of the incoming token to the command memory, (i) for each of those stored sequence indicators and associated second command identifiers, for which the stored sequence indicator is less or equal to the sequence indicator of the incoming token, in an order of the sequence indicators associated to the second command identifiers, to set the current sequence indicator in the current-sequence-indicator register to the stored sequence indicator and to forward the associated command identifier to the command memory, and to remove the stored sequence indicator and the associated command identifier from the SIC memory;

(ii) to set the current sequence indicator in the current-sequence-indicator register to the sequence indicator of the incoming token; and to forward the respective command identifier allocated to the token identifier of the incoming token to the command memory.

9. The event-processing unit of claim 1, wherein the next-command-computing stage comprises a next-command-identifier-computing unit configured to forward a command identifier;

a given control information comprises a next command identifier indicative of that command identifier which is to be forwarded next to the command memory after the processing of the given control information by the processing stage is completed;

the command memory is configured, upon reception of the command identifier from the next-command-identifier-computing unit, to provide the next command identifier included in the control information associated with the received command identifier to the next-command-identifier-computing unit; and the next-command-identifier-computing unit, upon reception of the next command identifier, is configured to forward the next command identifier to the command memory before forwarding any other command identifier to the command memory.

10. The event-processing unit of claim 2, wherein the data-processing stage comprises a token-identifier-modifying unit that receives the outgoing token identifier and the data provided by the data memory, and that is configured to modify the received outgoing token identifier using the data and to provide the modified outgoing token identifier.

11. The event processing unit of claim 6, wherein the data-processing stage comprises a command-identifier-modifying unit that receives a given one of the command identifiers included in the control information and the data provided by the data memory, and that is configured to modify the given command identifier using the data and to provide the modified given command identifier.

12. The event-processing unit of claim 1, wherein the input stage comprises:

a plurality of parallel input ports;

for each input port a temporary-input-port memory that receives a given incoming token from a respective given input port and that is configured to temporarily store the given incoming token, hereinafter referred to as temporarily-stored incoming token; and an input-selector unit that receives the temporarily-stored incoming tokens from the temporary-input-port memories and is configured to select, based on a predetermined selection scheme, one of the temporarily-stored incoming tokens and to forward the selected one of the temporarily-stored incoming tokens to the next-command computing stage.

13. The event-processing unit of claim 12, wherein
the next-command-computing stage further comprises a current-sequence-indicator register for storing a current sequence indicator, which is the sequence indicator associated to the command identifier last provided to the command memory;
the processing-control stage is configured, if indicated by the result of the flag-processing operation, to provide the current sequence indicator as a threshold sequence indicator indicative of a threshold allowable sequence indicator for enabling a forwarding of the incoming token by the input-selector unit;
the input-selector unit additionally is configured to refrain from forwarding those incoming tokens from at least one of the input ports to the next-command-computing stage, which have a sequence indicator of an amount larger than that of the threshold sequence indicator.

14. The event-processing unit of claim 1, wherein
the next-command-computing stage comprises a configuration interface for receiving command-set data from an external source and is configured to write the command-set data to the command memory.

15. The event-processing unit of claim 1, wherein
the data-processing stage comprises a data interface for receiving from an external source a data set comprising data in respective association with a data-memory address, and to store the received data in the data memory at the respective associated data-memory address; and wherein
the data-processing stage is configured to output the data comprised in the data memory via the data interface.

16. The event-processing unit of claim 2, wherein
the output stage comprises a plurality of parallel output ports; and
the control information comprises an output-port identifier indicative of that of the parallel output ports, which is to be used for outputting the outgoing token; and
the processing-control stage is additionally configured to provide the output-port identifier in association with the outgoing token; and
the output stage is configured to receive the output-port identifier and to output the outgoing token via the output port indicated by the output-port identifier.

17. An event-processing cluster, comprising
a plurality of event-processing units according to claim 2 in a serial or parallel configuration of event-processing units; wherein
a given event-processing unit is connected via its output stage to the input stage of any one or more further event-processing units.

18. The event-processing cluster of claim 16, wherein
the event-processing units are connected in serial configuration, and a plurality of the event-processing units is connected to a respective associated set of one or more configurable switches; wherein
the output stage of a given one of the event-processing units is connected to the input stage of that event-processing unit, which is next-neighboring to the given event-processing unit in a forward direction of the serial configuration, or to the input stage of another event processing unit;
any of the switches comprises at least two switch-input ports and at least two switch-output ports and a configurable set of connectors allowing a configurable connection between any selected one of the switch-input ports and any selected one of the switch-output ports; and
for the given one of the event-processing units and a given one of the respective associated switches:
(i) the output stage of the given event-processing unit is connected to one of the switch-input ports of the given switch,
(ii) one of the switch-output ports of the given switch is connected with the input stage the given event processing unit, and
(iii) one of the switch-output ports is connected with one of the switch-input ports of one of the switches of the set of switches associated to that event-processing unit, which is next-neighboring to the given event-processing unit in a backward direction of a serial configuration or associated to another event-processing unit.

* * * * *